United States Patent
Ono et al.

(10) Patent No.: US 7,557,569 B2
(45) Date of Patent: Jul. 7, 2009

(54) STATE MEASURING APPARATUS FOR ROTARY MACHINE

(75) Inventors: Koichiro Ono, Fujisawa (JP); Nagao Dohi, Fujisawa (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 12/280,870

(22) PCT Filed: Feb. 27, 2007

(86) PCT No.: PCT/JP2007/053688

§ 371 (c)(1),
(2), (4) Date: Aug. 27, 2008

(87) PCT Pub. No.: WO2007/102349

PCT Pub. Date: Sep. 13, 2007

(65) Prior Publication Data
US 2009/0033322 A1    Feb. 5, 2009

(30) Foreign Application Priority Data

Feb. 28, 2006  (JP) .............................. 2006-051605
Aug. 7, 2006   (JP) .............................. 2006-214194
Dec. 22, 2006  (JP) .............................. 2006-345849

(51) Int. Cl.
    G01B 7/30        (2006.01)
(52) U.S. Cl. ................. 324/207.25; 73/514.16
(58) Field of Classification Search ............ 324/207.11, 324/207.13, 207.22–207.23, 207.25, 244; 73/114.26, 514.16, 514.31, 514.39, 862.192–862.193, 73/862.322, 862.541, 862.69; 123/612, 617
See application file for complete search history.

(56) References Cited

U.S. PATENT DOCUMENTS 7,320,257 B2 *  1/2008  Takizawa et al. ....... 73/862.541

FOREIGN PATENT DOCUMENTS

| JP | 2004-45219 A | 2/2004 |
|----|---|---|
| JP | 2005-31063 A | 2/2005 |
| JP | 2005-43336 A | 2/2005 |
| JP | 2006-177741 A | 7/2006 |
| JP | 2006-317420 A | 11/2006 |
| JP | 2006-322928 A | 11/2006 |
| JP | 2007-93580 A | 4/2007 |
| JP | 2007-132918 A | 5/2007 |

OTHER PUBLICATIONS

"Best Car Supplement Volume Entitled Red Badge Series/Book Presenting Automotive Latest Mechanisms" written by Motoo Aoyama, p. 138 and 139, p. 146 to 149, Sansuisha Co., Ltd./Kodansha Ltd., Dec. 20, 2001.

* cited by examiner

*Primary Examiner*—Bot LeDynh
(74) *Attorney, Agent, or Firm*—Sughrue Mion, PLLC

(57) ABSTRACT

There are provided first and second characteristic change portions 9 and 10 having characteristic boundary inclination directions different from each other in an inner half portion and an outer half portion of the encoder 4. Detections portions of one pair of sensors $6a_1$ ($6b_1$, $6c_1$) and $6a_2$ ($6b_2$, $6c_2$) are opposed to three circumferential positions of both the characteristic change portions 9 and 10. A operator has a function of calculating the displacements x, y, z, and inclinations $\Phi x$, $\Phi z$, on the basis of phase differences among output signals of the sensors $6a_1$, $6a_2$, $6b_1$, $6b_2$, $6c_1$, and $6c_2$.

14 Claims, 10 Drawing Sheets

FIG. 12A
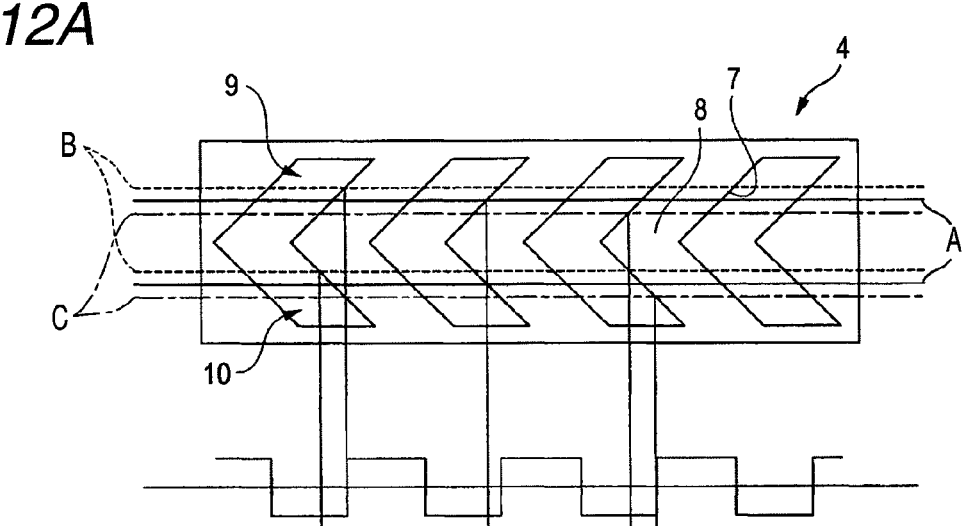
FIG. 12B
FIG. 12C
FIG. 12D
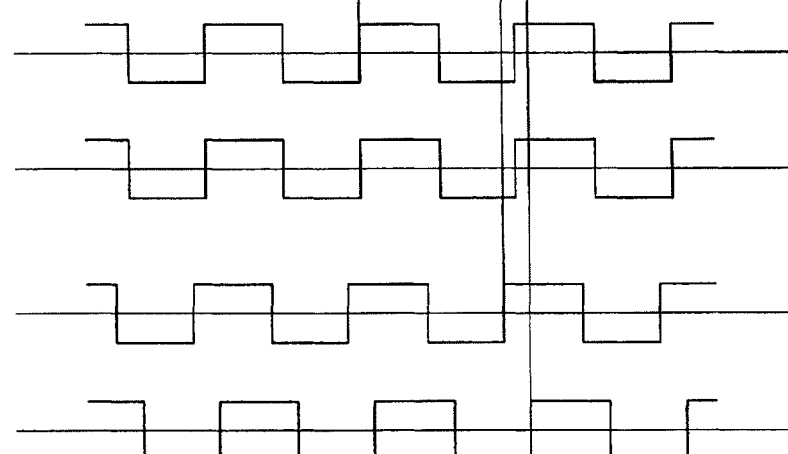

STATE MEASURING APPARATUS FOR ROTARY MACHINE

TECHNICAL FIELD

A state measuring apparatus for a rotary machine according to the invention is used to measure a state between a stationary member and a rotary member constituting the rotary machine such as a rolling bearing unit, that is, a relative displacement between both of the members, or an external force (load, moment) applied between both of the members. In addition, the resulting state is used to secure a driving stability of vehicles such as automobiles.

BACKGROUND ART

A wheel of an automobile is rotatably supported to a suspension device by a rolling bearing unit such as a double row angular rolling bearding unit. To secure a driving stability of the automobile, a vehicle driving stabilizing device such as an antilock break system (ABS), a traction control system (TCS), and an electronic vehicle stability control system (ESC), as described in Non-Patent Document 1 has been used. To control such various kinds of vehicle driving stabilizing device, a signal representing a rotating speed, acceleration applied to a vehicle body in each direction, or the like is necessary. To more precisely control them, it may be preferable to know magnitude of a load (e.g., one or both of a radial load and an axial load) applied through the wheel to the rolling bearing unit.

In consideration of such circumstances, in Patent Document 1, there is disclosed an invention relating to a rolling bearing unit including a state measuring device for measuring a radial load or an axial load applied to the rolling bearing unit on the basis of revolution speeds of a pair of rows of balls constituting the rolling bearing unit that is a double row angular rolling bearding unit. In the rolling bearing unit including the state measuring device described in Patent Document 1, the revolution speeds of both rows of balls are obtained as revolution speeds of a pair of retainers that retain the balls, and the radial load and the axial load are calculated on the basis of the revolution speeds of both rows of the balls. In case of such a conventional configuration, delicate shift may occur between the revolution speeds of both rows of the balls and the revolution speeds of both retainers, because of a gap inevitably existing between rolling surfaces of the balls and inner surfaces of pockets of both retainers. For this reason, to precisely obtain the radial load and the axial road, there is room for improvement.

Although not disclosed, a rolling bearing unit including a state measuring device using a special encoder was invented (e.g., Japanese Patent Application No. 2005-147642) as a structure capable of preventing measurement precision from deteriorating caused by the aforementioned inevitable shift, and it is under development. FIGS. 10 to 12 illustrate an example of such a rolling bearing unit including a state measuring device using a special encoder. In the previously invented rolling bearing unit including a state measuring device, a hub 2 serving as a rotation raceway ring rotating together with a wheel supported and fixed at the time of use is rotatably supported through a plurality of rolling elements 3 and 3, inside an outer ring 1 serving as a stationary raceway ring that does not rotate even at the time of use. Precompression is applied to the rolling elements 3 and 3 with contact angles opposite to each other (in the figure, back surface combination type). In the shown example, a ball is used as the rolling element 3. However, in case of an automobile bearing unit, a tapered roller may be used instead of the ball.

In an inner end of the hub 2 ("inner" in the axial direction means a width-direction center portion of a vehicle in state of mounting on the vehicle, which is the right side in FIGS. 1, 3, 5, 6, 7, 8, and 10. On the contrary, "outer" in the axial direction means a width-direction outside of the vehicle in the state of mounting on the vehicle, which is the left side in FIGS. 1, 3, 5, 7, 8, and 10. The same is applied to the whole specification.), a cylindrical encoder 4 is fixed to be concentric with the hub 2. In a cylindrical cover 5 having a bottom to close the inner end opening of the outer ring 1, a pair of sensors $6a_1$ and $6a_2$ are supported, and detectors for both sensors $6a_1$ and $6a_2$ are close to and opposed to an outer circumferential surface that is a detection surface of the encoder 4.

The encoder 4 is made of a magnetic metal sheet. A front half portion (axial inner half portion) of the outer circumferential surface serving as the detection surface of the encoder 4, through-holes 7 and 7 (first characteristic part) and column portions 8 and 8 (second characteristic part) are alternated in a circumferential direction and are disposed at equal distances. Boundaries between the through-holes 7 and 7 and the column portions 8 and 8 are inclined to the axial direction of the encoder 4 by the same angle, and inclined directions to the axial direction are reverse with a boundary that is the axial center of the encoder 4. Accordingly, the axial centers of the through-holes 7 and 7 and the column portions 8 and 8 have a "^" shape (or "<" shape) most protruding in the circumferential direction. In the axial outer half portion and the axial inner half portion having the different inclined directions of the boundaries on the detection surface, the axial outer half portion is a first characteristic change portion 9 and the axial inner half portion is a second characteristic change portion 10. As shown, the through-holes constituting both characteristic change portions 9 and 10 may be formed continuously to each other, and may be formed independently from each other. Even through detection precision is lower, only the boundary of any one characteristic change portion of both characteristic change portions 9 and 10 may be inclined to the axial direction, and the boundary of the other characteristic change portion may be made parallel to the axial direction.

Each of the pair of sensors $6a_1$ and $6a_2$ includes a permanent magnet and magnetic detection elements such as a hall IC, a hall element, an MR element, and a GMR element constituting a detection portion. Both sensors $6a_1$ and $6a_2$ are supported and fixed in a cover 5, the detection portion of one sensor $6a_1$ is close to and opposed to the first characteristic change portion 9, and the detection portion of the other sensor $6a_2$ is close to and opposed to the second characteristic change portion 10. Both sensors $6a_1$ and $6a_2$ are opposed to both characteristic change portions 9 and 10 at the same position relative to the circumferential direction of the encoder 4. In state where an axial load is not applied between the outer ring 1 and the hub 2, positions of the members are restricted so that the most protruding portion (portion at which the inclined direction of the boundary changes) in the circumferential direction at the axial center of the through-holes 7 and 7 and the column portions 8 and 8 is located at the center between both sensors $6a_1$ and $6a_2$.

In case of the rolling bearing unit including a state measuring device configured as described above, when an axial load is applied between the outer ring 1 and the hub 2 (the outer ring 1 and the hub 2 have a relative displacement in the axial direction), phases are shifted from each other in which output signals of both sensors $6a_1$ and $6a_2$ change. That is, in a neutral state where an axial load is not applied between the outer ring 1 and the hub 2, the detection portions of both sensors $6a_1$ and $6a_2$ are opposed to solid lines A and A shown in FIG. 12A, that is, to a portion which is shifted as much as the same distance in the axial direction from the most protruding portion. Accordingly, the phases of the output signals of both sensors $6a_1$ and $6a_2$ coincide with each other, as shown in FIG. 12C.

On the contrary, when a downward axial load in FIG. 12A is applied to the hub 2 to which the encoder 4 is fixed, the detection portions of both sensors $6a_1$ and $6a_2$ are opposed to broken lines B-B shown in FIG. 12A, that is, to a portion in which shafts in the axial direction from the most protruding portion are different from each other. In this state, the phases of the output signals of both sensors $6a_1$ and $6a_2$ are shifted from each other as shown in FIG. 12B. When an upward axial load is applied to the hub 2 to which the encoder 4 is fixed in FIG. 12A, the detection portions of both sensors $6a_1$ and $6a_2$ are opposed to dashed dotted lines C-C as shown in FIG. 12A, that is, to a portion in which shifts in the axial direction from the most protruding portion are reversely different from each other. In this state, the phases of the output signals of both sensors $6a_1$ and $6a_2$ are shifted from each other as shown in FIG. 12D.

As described above, in case of the previously invented structure, the phases of the output signals of both sensors $6a_1$ and $6a_2$ are shifted from each other in a direction along a direction (direction of a relative displacement of the outer ring 1 and the hub 2 in the axial direction) in which an axial load is applied between the outer ring 1 and the hub 2. The phases of the output signals of both sensor $6a_1$ and $6a_2$ are further shifted from each other by the axial load (relative displacement) as the axial load (relative displacement) gets larger. Accordingly, when the shifts in the phases of the output signals of both sensors $6a_1$ and $6a_2$ exist, it is possible to acquire a direction and a magnitude of the relative displacement of the outer ring 1 and the hub 2 in the axial direction and to acquire a direction and a magnitude of the axial load applied between the outer ring 1 and the hub 2, on the basis of a direction and a magnitude of the shifts. The relative displacement and the load are calculated on the basis of difference in the phases of the output signals of both sensors $6a_1$ and $6a_2$ by an operator 13. For this reason, relation between the difference in phase and the axial relative displacement and the load, which are previously examined by theoretical calculation or experiment, are input to the operator 13 in a form such as a formula or a map.

In case of the previously invented structure described above, the encoder is made of a metal plate, the first characteristic portion formed on the detection surface of the encoder is formed of the through-holes, and the second characteristic portion is formed of the column portion. In addition, the encoder may be made of a permanent magnet, the first characteristic portion formed on the detection surface of the encoder may be a portion magnetized to an N pole, and the second characteristic portion may be a portion magnetized to an S pole. With such a configuration, it is not necessary to mount a permanent magnet on a pair of sensors because the encoder is made of a permanent magnet. The encoder may be formed in a wheel shape, an axial side of the encoder may be used as the detection surface, and detection portions of the pair of sensors may be opposed to the detection surface in state where the detection portions are shifted diametrically. In this case, it is possible to acquire a displacement of the outer ring 1 and the hub 2 in the radial direction, and further, to acquire a radial load applied between the outer ring 1 and the hub 2.

In controlling the aforementioned vehicle driving stabilizing devices such as ABS, TCS, and ESC, it is possible to perform a higher precise control in case where both loads (displacement) of the aforementioned axial load (displacement) and radial load (displacement) are used as control information, as compared with case where any one load (displacement) thereof is used as control information. When moment (inclination between center axes of the outer ring 1 and the hub 2) applied between the outer ring 1 and the hub 2 is used as control information in addition to both loads (displacement), it is possible to a higher precise control. For this reason, it is preferable to use a structure capable of measuring three kinds of states such as the axial load (displacement), the radial load (displacement), and the moment (inclination).

As a method for realizing such a structure, for example, there is a method in which three state measuring devices are mounted on a rolling bearing unit, such as a state measuring device including an encoder for measuring the axial load (displacement), a state measuring device including an encoder for measuring the radial load (displacement), and a state measuring device including an encoder for measuring the moment (inclination). However, when the method is employed in which the state measuring devices each including one encoder are mounted on the rolling bearing unit as many as the same number (3) as kinds of states to be measured, cost of the used state measuring devices increases and a space for mounting all the state measuring devices may not be secured according to any rolling bearing unit (e.g., a rolling bearing unit for a small-size vehicle).

Meanwhile, as an invention capable of solving such a problem to some extent, in Japanese Patent application No. 2005-147642, there is described a state measuring device capable of measuring two kinds of states of the axial load (displacement) and the moment (inclination), using one encoder. Although not disclosed, in Japanese Patent Application No. 2006-115302, there is described a state measuring device capable of measuring two kinds of states of the axial load (displacement) and the radial displacement, using one encoder. When these state measuring devices are used (two kinds among the three kinds are measured by the previously invented devices), the number of (state measuring devices including) encoders used to measure the three kinds of states can be reduced from three to two. For this reason, the aforementioned problem can be solved as much as that. However, in order to further sufficiently solve the problem, it is desired to realize a state measuring device capable of measuring the three kinds of states, using one encoder.

Patent Document 1: Japanese Unexamined Patent Application Publication No. 2005-31063.

Non-Patent Document 1: "Best Car Supplement Volume Entitled Red Badge Series/Book Presenting Automotive Latest Mechanisms" written by Motoo AOYAMA, p. 138 and 139, p. 146 to 149, Sansuisha Co., Ltd./Kodansha Ltd., Dec. 20, 2001.

DISCLOSURE OF THE INVENTION

Problem that the Invention is to Solve

To solve the aforementioned problem, the present invention is to provide a state measuring device for a rotary machine to realize a structure capable of measuring the three kinds of states, using one encoder.

Means for Solving the Problem

The aforementioned problems are solved by the following means. That is, according to a first aspect of the invention, there is provided a state measuring apparatus for a rotary machine. The apparatus comprises: a rotary machine including: a stationary member that does not rotate in a using state; and a rotary member rotatably supported to the stationary member; and a state measuring device including: an encoder provided concentrically to the rotary member or to a member rotating together with the rotary member; a sensor device supported and fixed to the stationary member; and an operator. The encoder is provided with: a detection surface disposed on a circumferential surface of the encoder; and first and second characteristic change portions alternately disposed on the detection surface at equal distances in a circumferential direction. Characteristics of the first and second characteristic change portions alternately change in the circumferential direction with equal pitches, and at least one of phases in characteristic change of the first and second characteristic change portions gradually changes in an axial direction with being different from that of the other characteristic change portion. The sensor device includes three or more sensors for changing an output signal in response to change in characteristic of a portion to which the detection portion is opposed, a detection portion of one sensor among them is opposed to the first characteristic change portion, a detection portion of another sensor is opposed to the second characteristic portion, and a detection portion of the other sensor is opposed to a portion that does not overlap with a portion to which the detection portion of the other sensors is opposed in the first and second characteristic change portions. The operator has a function of calculating displacements or inclinations of the encoder with respect to the stationary member in two or more directions, on the basis of at least two phase differences (or phase difference ratios) of phase differences {or phase difference ratios (=phase difference/one period)} between output signals of the sensors.

As the separate member, a rotor or a joint coupled and fixed to a hub constituting a rolling bearing unit for supporting a wheel may be used.

According to a second aspect of the invention, in the state measuring apparatus for a rotary machine according to the first aspect of the invention, the sensor device includes three sensor sets each consisting of a pair of sensors, the detection portion of one sensor of the pair of sensors constituting each sensor set is opposed to a portion where circumferential positions of the first characteristic change portion are different from each other, and the detection portion of the other sensor is opposed to a portion where circumferential positions are different from each other in the second characteristic change portion. When a y-axis of 3-dimensional rectangular coordinates consisting of an x-axis, a y-axis, and a z-axis orthogonal to one another coincides with a center axis of the stationary member, the operator has a function of calculating a displacement x in an x-axis direction, a displacement y in a y-axis direction, and a displacement z in a z-axis direction, an x-axis circumferential inclination $\Phi x$, and a z-axis circumferential inclination $\Phi z$ of the encoder with respect to the stationary member, on the basis of five phase differences between output signals of two sensors, in five combinations of each two sensor selected from the sensors.

According to a third aspect of the invention, in the state measuring apparatus for a rotary machine according to the second aspect of the invention, the five combinations of each two sensors include three combinations of each two sensors constituting the same sensor sets as each other and two combinations of each two sensors constituting the different sensor sets from each other.

According to a fourth aspect of the invention, in the state measuring apparatus for a rotary machine according to the second aspect of the invention, the detection portion of one sensor and the detection portion of the other sensor constituting each of the sensor sets are at the same position in the circumferential direction, and are opposed to the first characteristic change portion and the second characteristic change portion, respectively.

According to a fifth aspect of the invention, in the state measuring apparatus for a rotary machine according to the second aspect of the invention, the detection portion of one sensor constituting each of the sensor sets is opposed to a circumferential equal-distance position of the first characteristic change portion, and the detection portion of the other sensor is opposed to a circumferential equal-distance position of the second characteristic change portion.

According to a sixth aspect of the invention, in the state measuring apparatus for a rotary machine according to the first aspect of the invention, a phase in characteristic change of the other characteristic change portion of the first and second characteristic change portions does not change in the axial direction.

According to a seventh aspect of the invention, in the state measuring apparatus for a rotary machine according to the first aspect of the invention, the operator has a function of calculating an external force (e.g., x-axis load Fx, y-axis load Fy, z-axis load Fz, x-axis circumferential moment Mx, z-axis circumferential moment Mz) applied between the stationary member and the rotary member, on the basis of the displacement (e.g., x, y, z) and the inclination (e.g., $\Phi x$, $\Phi z$) of the encoder with respect to the stationary member calculated by the operator.

According to an eighth aspect of the invention, in the state measuring apparatus for a rotary machine according to the seventh aspect of the invention, the operator has a function of calculating a radial displacement (displacement in x-z plane) of the rotary member at a predetermined position of the stationary member in the axial direction (y-axis direction), on the basis of the displacement and the inclination of the encoder with respect to the stationary member calculated by the operator, and calculating a radial load in the same direction as the radial displacement applied between the stationary member and the rotary member on the basis of the radial displacement.

According to a ninth aspect of the invention, in the state measuring apparatus for a rotary machine according to the eighth aspect of the invention, an axial position of an elastic center of the rotary machine in the same direction as the radial displacement for calculation is an predetermined position of the stationary member in the axial direction.

According to a tenth aspect of the invention, in the state measuring apparatus for a rotary machine according to the eighth aspect of the invention, an axial position, where the radial displacement of the rotary member is 0 at the time when only a moment is applied between the stationary member and the rotary member, is a predetermined position of the stationary member in the axial direction.

According to an eleventh aspect of the invention, in the state measuring apparatus for a rotary machine according to the eighth aspect of the invention, any axial position, between an axial position of an elastic center of the rotary machine in the same direction as the radial displacement for calculation and an axial position where the radial displacement of the rotary member is 0 at the time when only a moment is applied between the stationary member and the rotary member, is a predetermined position of the stationary member in the axial direction.

According to a twelfth aspect of the invention, in the state measuring apparatus for a rotary machine according to the seventh aspect of the invention, the operator corrects a predetermined position of the stationary member in the axial direction, on the basis of a component in a direction different from the radial displacement for calculation, in the displacement or the inclination of the encoder with respect to the stationary member calculated by the operator, or in the external force applied between the stationary member and the rotary member calculated on the basis of the displacement or the inclination.

According to a thirteenth aspect of the invention, in the state measuring apparatus for a rotary machine according to the first aspect of the invention, the rotary machine is a rolling bearing unit. The rolling bearing unit includes: a stationary raceway ring that is the stationary member; a rotary raceway ring that is the rotary member; and a plurality of rolling elements that are provided between the stationary raceway ring and the rotary raceway ring.

According to a fourteenth aspect of the invention, in the state measuring apparatus for a rotary machine according to the thirteenth aspect of the invention, the rolling bearing unit is a hub unit for supporting an automobile wheel, the stationary raceway ring is supported to a suspension device of an automobile in a using state, and the wheel is coupled and fixed to a hub that is the rotary raceway ring.

Advantage of the Invention

According to the state measuring apparatus for a rotary machine of the invention as described above, it is possible to acquire two or more direction displacements or inclinations (e.g., in case of the invention described in the second aspect of the present invention, five states in total of three kinds of an axial displacement (y), a radial displacements (x, y), and inclinations ($\Phi x$, $\Phi z$) of the encoder 2 with respect to the stationary member by using only one encoder. For this reason, it is possible to sufficiently reduce cost of the state measuring apparatus used to calculate these two or more direction displacements or inclinations. In addition, it is possible to sufficiently reduce size of the state measuring apparatus. Therefore, even when there is no wide space in the rotary machine, it is possible to easily dispose the state measuring apparatus in the rotary machine.

When the structure described in the sixth aspect of the present invention is employed, it is possible to reduce the amount of calculation at the time of calculating the two or more direction displacements or inclinations from phase differences (or phase difference ratios). For this reason, it is possible to calculate these two or more direction displacements or inclinations with a state closer to real time.

When the structure described in the seventh aspect of the present invention, it is possible to calculate external forces {e.g., two kinds of three loads and two moments: an axial load (Fy), radial loads (Fx, Fz), and moments (Mx, Mz)} applied between the stationary member and the rotary member by using one encoder.

Particularly, in case of the invention described in the second or seventh aspect of the present invention, since it is possible to acquire two-direction (x direction, z direction) radial displacements (x, z) and radial loads (Fx, Fz) orthogonal to each other, it is possible to easily calculate the other-direction radial displacements and radial loads in the x-z plane by using these components. Similarly, in case of the invention, since it is possible to acquire two-axis (x axis, z axis) circumferential inclinations ($\Phi x$, $\Phi z$) and moments (Mx, Mz) orthogonal to each other, it is possible to easily calculate the other-axis circumferential inclinations and moments in the x-z plane, by using these components.

BRIEF DESCRIPTION OF THE DRAWINGS

FIGS. 12A to 12D are diagrammatic views illustrating states where output signals of a pair of sensors change on the basis of an axial load;

DESCRIPTION OF REFERENCE NUMERALS AND SIGNS

1: OUTER RING
2: HUB
3: ROLLING ELEMENT
4, 4a: ENCODER
5: COVER
$6a_1$, $6a_2$, $6b_1$, $6b_2$, $6c_1$, $6c_2$: SENSOR
7, 7a, 7b: THROUGH-HOLE
8, 8a, 8b: COLUMN PORTION
9, 9a: FIRST CHARACTERISTIC CHANGE PORTION
10, 10a: SECOND CHARACTERISTIC CHANGE PORTION
11: ROLLING BEARING UNIT
12: STATE MEASURING DEVICE
13: OPERATOR

BEST MODE FOR CARRYING OUT THE INVENTION

First Embodiment

Figure 10:
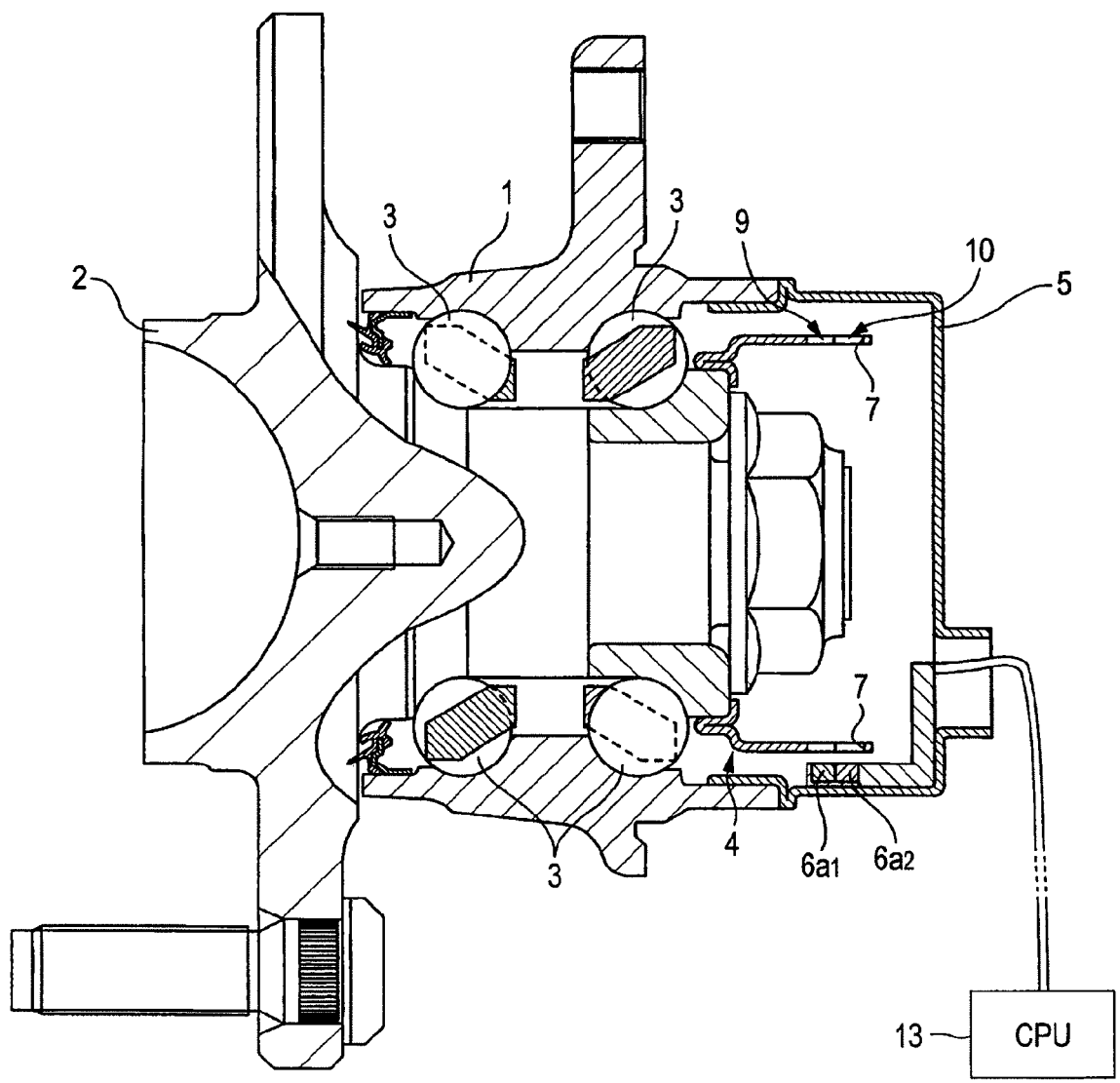
FIG. 10 is a sectional view illustrating an example of a rolling bearing unit including a state measuring device according to the prior invention.

FIGS. 1 to 8 illustrate a first example corresponding to a first aspect to a fifth aspect and a seventh aspect to a fourteenth aspect, according to an embodiment of the invention. A state measuring apparatus for a rolling bearing unit of the present example is configured by mounting a state measuring device 12 on a wheel supporting rolling bearing unit 11 that is a rotary machine. Since the rolling bearing unit 11 has the same structure as the previously invented structure shown in FIG. 10, the same reference numerals are given to the equivalent parts and the description thereof is omitted. In the present example, in case of three-dimensional coordinates consisting of an x axis, a y axis, and a z axis orthogonal to one another, a center axis (horizontal axis) of an outer ring 1 serving as a stationary raceway ring constituting the rolling bearing unit 11 is set to the y axis, a vertical axis is set to the z axis, and a front and rear axis is set to the x axis for the following description.

Figure 1:
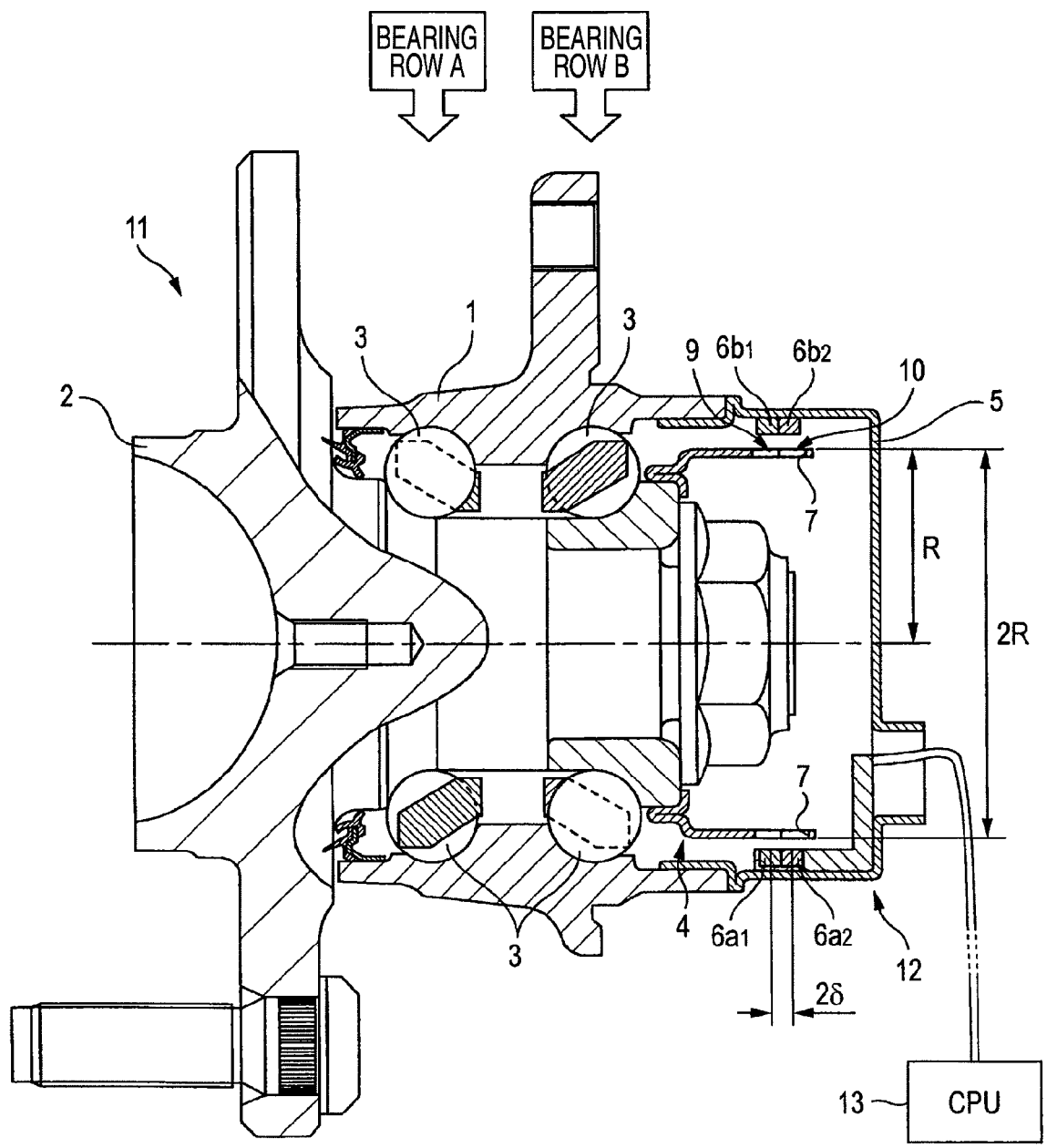
FIG. 1 is a sectional view illustrating a first example according to an embodiment of the invention.
Figure 2:
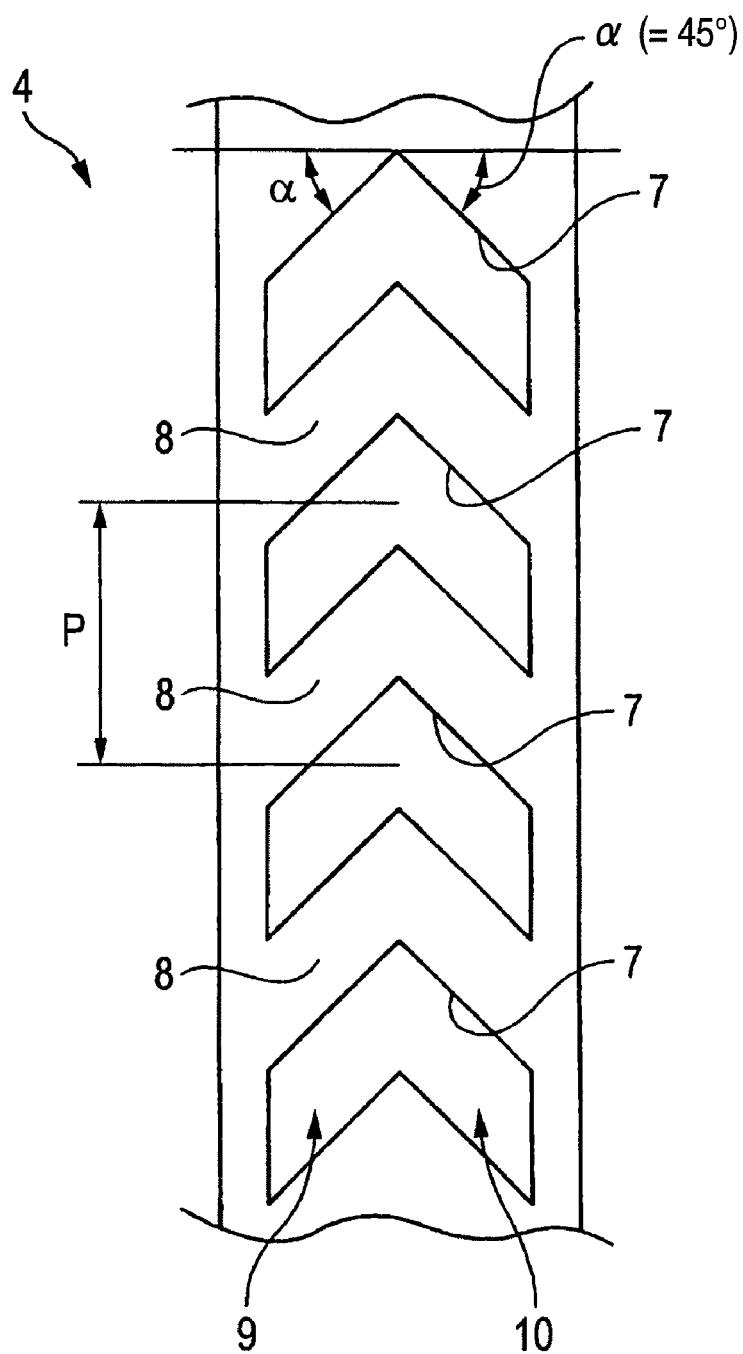
FIG. 2 is a view illustrating a part of a detection surface of an encoder as viewed from the diametrical outside.
Figure 3:
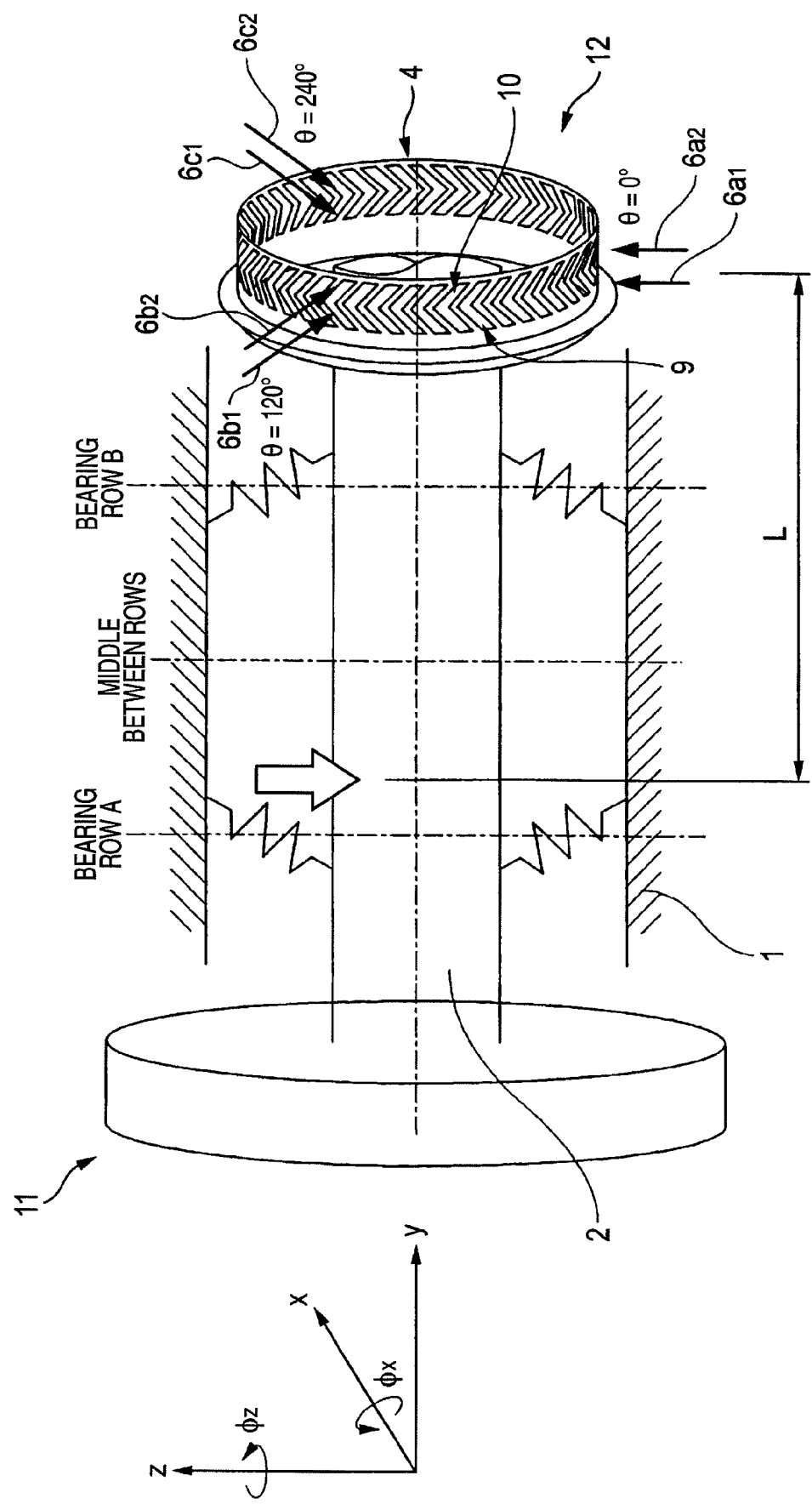
FIG. 3 is a schematic view illustrating a first example according to an embodiment of the invention.
Figure 4:
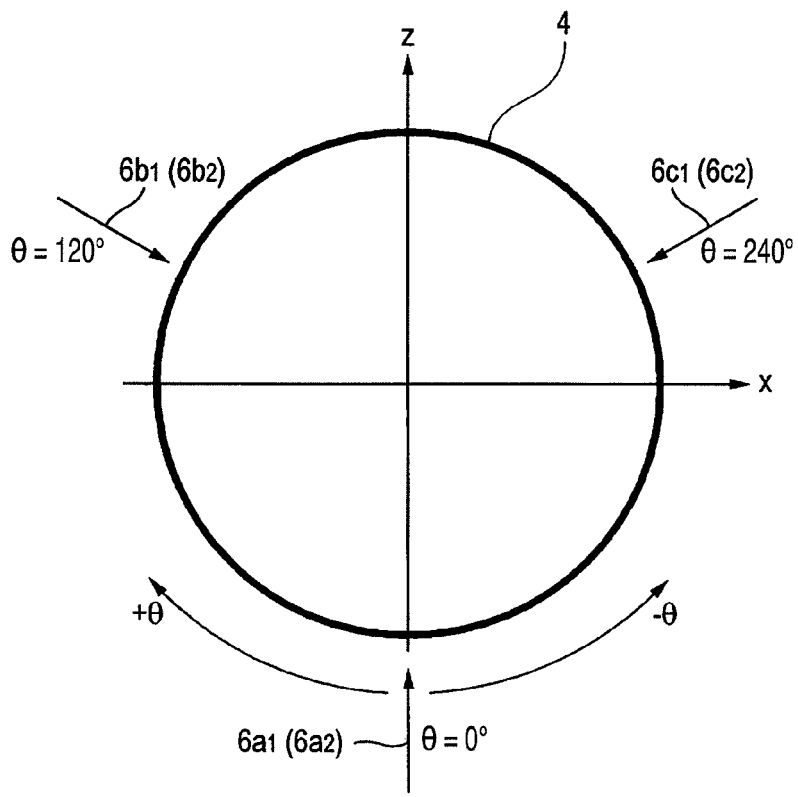
FIG. 4 is a view illustrating a circumferential position of a sensor.
Figure 11:
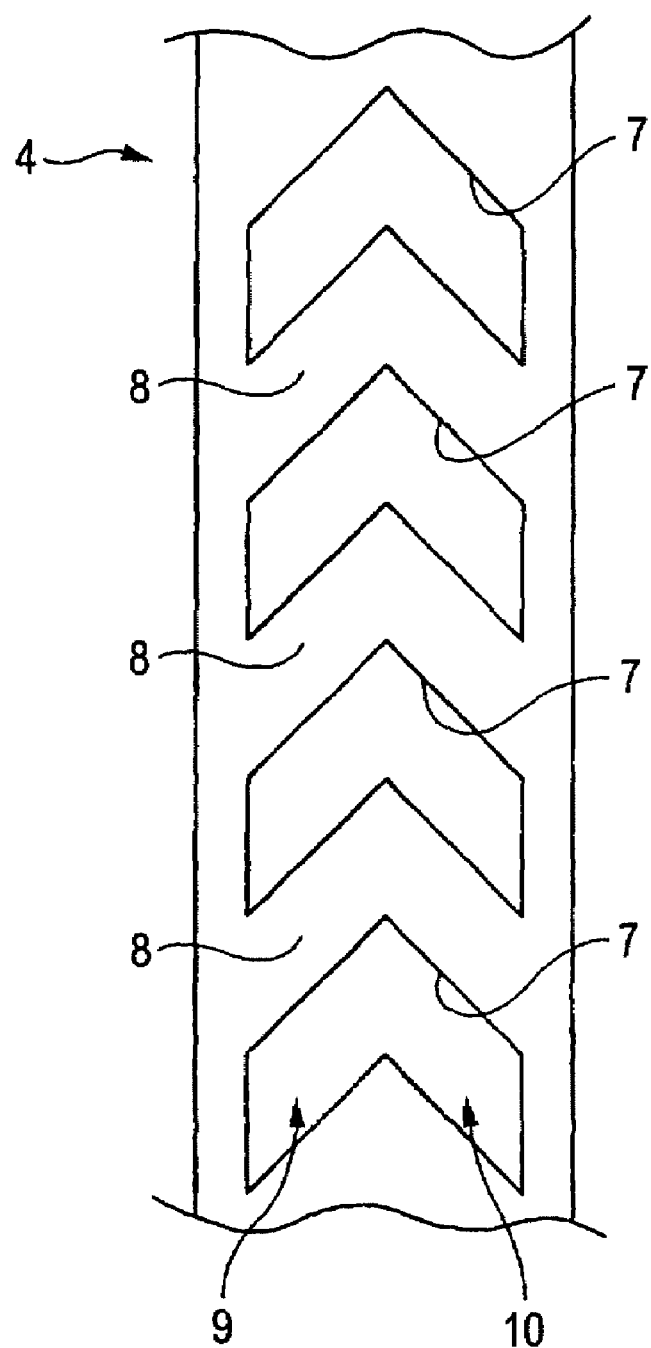
FIG. 11 is a view illustrating a part of a detection surface of an encoder as viewed from the diametrical outside.

The state measuring device 12 includes one encoder 4 outward fitted and fixed to an inner end of a hub 2 serving as a rotary raceway ring constituting the rolling bearing unit 11, six sensors 6a₁, 6a₂, 6b₁, 6b₂, 6c₁, and 6c₂ supported and fixed to a cover 5 joined with an inner end opening of the outer ring 1, and an operator 13. Since the encoder 4 has the same structure as the previously invented structure shown in FIGS. 10 to 12, the same reference numerals are given to the same parts and the overlapping description thereof is omitted. The six sensors 6a₁, 6a₂, 6b₁, 6b₂, 6c₁, and 6c₂ each include a permanent magnet and magnetic detection elements such as a hall IC constituting a detection portion, a hall element, an MR element, and a GMR element. Such six sensors 6a₁, 6a₂, 6b₁, 6b₂, 6c₁, and 6c₂ are disposed two by two at positions opposed to circumferential equal-distance three portions in the vicinity of an inner end of an outer circumferential surface of the encoder 4, which are detection surfaces. Specifically, when circumferential position (angle) θ is set as shown in FIG. 4, two sensors 6a₁ and 6a₂ constituting a first sensor set are disposed at a position of θ=0°, two sensors 6b₁ and 6b₂ constituting a second sensor set are disposed at a position of θ=120°, and two sensors 6c₁ and 6c₂ constituting a third sensor set are disposed at a position of θ=240°.

Detection portions of the sensors 6a₁, 6b₁, and 6c₁ of each two sensors constituting each sensor set are opposed to a first characteristic change portion 9 is an axial outer half portion of the detection surface, and detection portions of the other sensors 6a₂, 6b₂, and 6c₂ are opposed to a second characteristic change portion 10 that is an axial inner half portion of the detection surface. That is, in case where the outer ring 1 and the hub 2 are in a neutral state (state where center axes thereof coincide with each other and there is no axial displacement), the detection portions of the sensors 6a₁, 6a₂, 6b₁, 6b₂, 6c₁, and 6c₂ are opposed to a width-direction middle of the first characteristic change portion 9 or the second characteristic change portion 10. In state where an external force is not applied, the circumferential positions (angle) θ where the detection portions of a pair of sensors 6a₁ (6b₁, 6c₁) and 6a₂ (6b₂, 6c₂) are opposed to both characteristic change portions 9 and 10 coincide with each other. Therefore, in case of the present example, an initial phase difference (phase difference in state where an external force is not applied) between output signals of the pair of sensors 6a₁ (6b₁, 6c₁) and 6a₂ (6b₂, 6c₂) constituting the same sensor set becomes 0. In the present example, a pitch (circumferential length in one period) P of characteristic change between both characteristic change portions 9 and 10 is restricted so that an initial phase difference between the sensors constituting the different sensor sets (existing at different circumferential positions θ) becomes 0.

In case of the present example configured as described above, the external force is applied to the rolling bearing unit 11 through the wheel and thus a positional relation between the outer ring 1 (the detection portions of the sensors 6a₁, 6a₂, 6b₁, 6b₂, 6c₁, and 6c₂) and the hub 2 (the detection surface of the encoder 4) deviates, thereby changing the phases of the output signals of the sensors 6a₁, 6a₂, 6b₁, 6b₂, 6c₁, and 6c₂. In this case, the amount (magnetic phase difference) of change of the phases of the output signals of the sensors 6a₁, 6a₂, 6b₁, 6b₂, 6c₁, and 6c₂ is represented by a magnetic phase difference ratio (magnetic phase difference/one period). Specifically, in one pair of sensors 6a₁ (6b₁, 6c₁) and 6a₂ (6b₂, 6c₂) constituting each sensor set, a magnetic phase difference ratio with respect to one sensor 6a₁ (6b₁, 6c₁) disposed outside the axial direction is represented by $\varepsilon_{out}(\theta)$ (θ=0°, 120°, 240°), a magnetic phase difference ratio with respect to the other sensor 6a₂ (6b₂, 6c₂) disposed inside the axial direction is represented by $\varepsilon_{in}(\theta)$ (θ=0°, 120°, 240°). In addition, an x-axis displacement of the encoder 4 with respect to the outer ring 1 is represented by x, a y-axis displacement is represented by y, a z-axis displacement is represented by z, an inclination of x-axis circumference is represented by Φx, and an inclination of z-axis circumference is represented by Φz.

In this case, the following relation of Equations 1 and 2 is satisfied among the magnetic phase difference ratios $\varepsilon_{out}(\theta)$ and $\varepsilon_{in}(\theta)$; the displacements x, y, and z; and the inclinations Φx and Φy.

$$\varepsilon_{out}(\theta) = -\frac{1}{P}\cos\theta \cdot x - \frac{\tan\alpha}{P} \cdot y + \frac{1}{P}\sin\theta \cdot z - \quad (1)$$
$$\left(R\cos\theta \cdot \frac{\tan\alpha}{P} + \frac{\delta}{P}\sin\theta\right) \cdot \phi_x - \left(R\sin\theta \cdot \frac{\tan\alpha}{P} - \frac{\delta}{P}\cos\theta\right) \cdot \phi_z$$

$$\varepsilon_{in}(\theta) = -\frac{1}{P}\cos\theta \cdot x + \frac{\tan\alpha}{P} \cdot y + \frac{1}{P}\sin\theta \cdot z + \quad (2)$$
$$\left(R\cos\theta \cdot \frac{\tan\alpha}{P} + \frac{\delta}{P}\sin\theta\right) \cdot \phi_x + \left(R\sin\theta \cdot \frac{\tan\alpha}{P} - \frac{\delta}{P}\cos\theta\right) \cdot \phi_z$$

Signs on the right side of Equation 1 and 2 have the following meanings.

P: pitch of characteristic change of the first and second characteristic change portions 9 and 10 (circumferential length of one period).

α: inclination angle to the axial direction in characteristic boundary between the first and second characteristic change portions 9 and 10. α=45° in the present example.

R: radius of the first and second characteristic change portions 9 and 10 (detection surface).

δ: ½ of distance (2δ) in the axial direction between the centers of the detection portions of one pair of sensors 6a₁ (6b₁, 6c₁) and 6a₂ (6b₂, 6c₂) constituting each sensor set.

When θ=0° and α=45° are assigned to Equations 1 and 2, respectively, the magnetic phase difference ratios $\varepsilon_{out}(0)$ and $\varepsilon_{in}(0)$ in the sensors 6a₁ and 6a₂ constituting the first sensor set are obtained as follows.

$$\varepsilon_{out}(0) = -\frac{1}{P} \cdot x - \frac{1}{P} \cdot y - \frac{R}{P} \cdot \phi_x + \frac{\delta}{P} \cdot \phi_z \quad (3)$$

$$\varepsilon_{in}(0) = -\frac{1}{P} \cdot x + \frac{1}{P} \cdot y + \frac{R}{P} \cdot \phi_x - \frac{\delta}{P} \cdot \phi_z \quad (4)$$

In addition, when θ=120° and α=45° are assigned to Equations 1 and 2, respectively, the magnetic phase difference ratios $\varepsilon_{out}(120)$ and $\varepsilon_{in}(120)$ with respect to the sensors 6b₁ and 6b₂ constituting the second sensor set are obtained as follows.

$$\varepsilon_{out}(120) = +\frac{0.5}{P} \cdot x - \frac{1}{P} \cdot y + \frac{0.866}{P} \cdot z + \quad (5)$$
$$\left(\frac{0.5 \cdot R}{P} - \frac{0.866 \cdot \delta}{P}\right) \cdot \phi_x - \left(\frac{0.866 \cdot R}{P} + \frac{0.5 \cdot \delta}{P}\right) \cdot \phi_z$$

-continued $$\varepsilon_{in}(120) = +\frac{0.5}{P} \cdot x + \frac{1}{P} \cdot y + \frac{0.866}{P} \cdot z - \left(\frac{0.5 \cdot R}{P} - \frac{0.866 \cdot \delta}{P}\right) \cdot \phi_x + \left(\frac{0.866 \cdot R}{P} + \frac{0.5 \cdot \delta}{P}\right) \cdot \phi_z \quad (6)$$

In addition, when θ=240° and α=45° are assigned to Equations 1 and 2, respectively, the magnetic phase difference ratios $\varepsilon_{out}(240)$ and $\varepsilon_{in}(240)$ with respect to the sensors $6c_1$ and $6c_2$ constituting the third sensor set are obtained as follows.

$$\varepsilon_{out}(240) = +\frac{0.5}{P} \cdot x - \frac{1}{P} \cdot y - \frac{0.866}{P} \cdot z + \left(\frac{0.5 \cdot R}{P} + \frac{0.866 \cdot \delta}{P}\right) \cdot \phi_x + \left(\frac{0.866 \cdot R}{P} - \frac{0.5 \cdot \delta}{P}\right) \cdot \phi_z \quad (7)$$

$$\varepsilon_{in}(240) = +\frac{0.5}{P} \cdot x + \frac{1}{P} \cdot y - \frac{0.866}{P} \cdot z - \left(\frac{0.5 \cdot R}{P} + \frac{0.866 \cdot \delta}{P}\right) \cdot \phi_x - \left(\frac{0.866 \cdot R}{P} - \frac{0.5 \cdot \delta}{P}\right) \cdot \phi_z \quad (8)$$

Thus, when a phase difference (mutual phase difference) between the output signals of one pair of sensors $6a_1$ and $6a_2$ constituting the first sensor set is represent with a mutual phase difference ratio (mutual phase difference/one period), the following is obtained.

$$\varepsilon_{in}(0) - \varepsilon_{out}(0) = +\frac{2}{P} \cdot y + \frac{2 \cdot R}{P} \cdot \phi_x - \frac{2 \cdot \delta}{P} \cdot \phi_z \quad (9)$$

In addition, when a phase difference (mutual phase difference) between the output signals of one pair of sensors $6b_1$ and $6b_2$ constituting the second sensor set is represent with a mutual phase difference ratio, the following is obtained.

$$\varepsilon_{in}(120) - \varepsilon_{out}(120) = \\ +\frac{2}{P} \cdot y - \left(\frac{1.0 \cdot R}{P} - \frac{1.732 \cdot \delta}{P}\right) \cdot \phi_x + \left(\frac{1.732 \cdot R}{P} + \frac{1.0 \cdot \delta}{P}\right) \cdot \phi_z \quad (10)$$

In addition, when a phase difference (mutual phase difference) between the output signals of one pair of sensors $6c_1$ and $6c_2$ constituting the third sensor set is represent with a mutual phase difference ratio, the following is obtained.

$$\varepsilon_{in}(240) - \varepsilon_{out}(240) = \\ +\frac{2}{P} \cdot y - \left(\frac{1.0 \cdot R}{P} + \frac{1.732 \cdot \delta}{P}\right) \cdot \phi_x - \left(\frac{1.732 \cdot R}{P} - \frac{1.0 \cdot \delta}{P}\right) \cdot \phi_z \quad (11)$$

In this case, two kinds of phase differences (mutual phase difference) between two sensors constituting different sensor sets (existing at different circumferential position θ) are represented by mutual phase differences, respectively. Two kinds of phase differences between two sensors employed herein may be any two of a phase difference between outside sensors, a phase difference between inside sensors, and a phase difference between an inside sensor and an outside sensor. However, in the present example, two kinds of phase differences between the outside sensors (between sensors $6a_1$ and $6b_1$, and between $6a_1$ and $6c_1$) are employed. Two kinds of mutual phase difference ratios between the sensors are as follows, respectively.

$$\varepsilon_{out}(120) - \varepsilon_{out}(0) = +\frac{1.5}{P} \cdot x + \frac{0.866}{P} \cdot z + \left(\frac{1.5 \cdot R}{P} - \frac{0.866 \cdot \delta}{P}\right) \cdot \phi_x - \left(\frac{0.866 \cdot R}{P} + \frac{1.5 \cdot \delta}{P}\right) \cdot \phi_z \quad (12)$$

$$\varepsilon_{out}(240) - \varepsilon_{out}(0) = +\frac{1.5}{P} \cdot x - \frac{0.866}{P} \cdot z + \left(\frac{1.5 \cdot R}{P} + \frac{0.866 \cdot \delta}{P}\right) \cdot \phi_x + \left(\frac{0.866 \cdot R}{P} - \frac{1.5 \cdot \delta}{P}\right) \cdot \phi_z \quad (13)$$

In case of the structure in the present example as described above, since it is possible to obtain five equations (Equations 9 to 13) about five unknown quantities (displacements x, y, z, and inclinations Φx, Φz), the five unknown quantities (displacements x, y, z, and inclinations Φx, Φz) can analytically acquired. That is, the five equations (Equations 9 to 13) are represented by a matrix as follows.

$$\begin{bmatrix} \varepsilon_{in}(0) - \varepsilon_{out}(0) \\ \varepsilon_{in}(120) - \varepsilon_{out}(120) \\ \varepsilon_{in}(240) - \varepsilon_{out}(240) \\ \varepsilon_{out}(120) - \varepsilon_{out}(0) \\ \varepsilon_{out}(240) - \varepsilon_{out}(0) \end{bmatrix} = \quad (14)$$

$$\frac{1}{P} \cdot \begin{bmatrix} 0 & +2 & 0 & +2 \cdot R & -2 \cdot \delta \\ 0 & +2 & 0 & -1.0 \cdot R + 1.732 \cdot \delta & +1.732 \cdot R + 1.0 \cdot \delta \\ 0 & +2 & 0 & -1.0 \cdot R - 1.732 \cdot \delta & -1.732 \cdot R + 1.0 \cdot \delta \\ +1.5 & 0 & +0.866 & +1.5 \cdot R - 0.866 \cdot \delta & -0.866 \cdot R - 1.5 \cdot \delta \\ +1.5 & 0 & -0.866 & +1.5 \cdot R + 0.866 \cdot \delta & +0.866 \cdot R - 1.5 \cdot \delta \end{bmatrix} \cdot \begin{bmatrix} x \\ y \\ z \\ \phi_x \\ \phi_z \end{bmatrix}$$

This is represented by an equation about the five unknown quantities (displacements x, y, z, and inclinations Φx, Φz) as follows.

$$\begin{bmatrix} x \\ y \\ z \\ \phi_x \\ \phi_z \end{bmatrix} = P \cdot \quad (15)$$

$$\begin{bmatrix} 0 & +2 & 0 & +2 \cdot R & -2 \cdot \delta \\ 0 & +2 & 0 & -1.0 \cdot R + 1.732 \cdot \delta & +1.732 \cdot R + 1.0 \cdot \delta \\ 0 & +2 & 0 & -1.0 \cdot R - 1.732 \cdot \delta & -1.732 \cdot R + 1.0 \cdot \delta \\ +1.5 & 0 & +0.866 & +1.5 \cdot R - 0.866 \cdot \delta & -0.866 \cdot R - 1.5 \cdot \delta \\ +1.5 & 0 & -0.866 & +1.5 \cdot R + 0.866 \cdot \delta & +0.866 \cdot R - 1.5 \cdot \delta \end{bmatrix}^{-1} \cdot$$

-continued $$\begin{bmatrix} \varepsilon_{in}(0) - \varepsilon_{out}(0) \\ \varepsilon_{in}(120) - \varepsilon_{out}(120) \\ \varepsilon_{in}(240) - \varepsilon_{out}(240) \\ \varepsilon_{out}(120) - \varepsilon_{out}(0) \\ \varepsilon_{out}(240) - \varepsilon_{out}(0) \end{bmatrix}$$

All of P, R, and δ on the right side of Equation 15 are constants defined depending upon structure of the present example, similarly with the above α(=45°). Five mutual phase difference ratios "$\varepsilon_{in}(0)-\varepsilon_{out}(0)$", "$\varepsilon_{in}(120)-\varepsilon_{out}(120)$", "$\varepsilon_{in}(240)-\varepsilon_{out}(240)$", "$\varepsilon_{out}(120)-\varepsilon_{out}(0)$", and "$\varepsilon_{out}(240)-\varepsilon_{out}(0)$" can be acquired on the basis of the output signals of the six sensors $6a_1$, $6a_2$, $6b_1$, $6b_2$, $6c_1$, and $6c_2$. Accordingly, when the right side of Equation 15 is calculated by the operator 13 on the basis of the constants P, R, and δ and five mutual phase difference ratios, it is possible to obtain the five unknown quantities (displacements x, y, z, and inclinations Φx, Φz).

A predetermined relation defined according to an electric force or the like of the rolling bearing unit 11 is formed between the five-direction displacements (displacements x, y, z, and inclinations Φx, Φz); and five-direction loads or moments (x-axis load Fx, y-axis load Fy, z-axis load Fz, X-axis circumferential moment Mx, and z-axis circumferential moment Mz) applied between the outer ring 1 and the hub 2 corresponding thereto. The predetermined relation can be acquired by calculation based on an elastic contact theory well known in the field of rolling bearing units, and also can be acquired by an experiment. Therefore, when an expression or a map representing the predetermined relation is stored in a memory of the operator 13, it is possible to acquire the five-direction loads and moments (loads Fx, Fy, Fz, and moments Mx, Mz) on the basis of the five-direction displacements (displacement x, y, z, and inclinations Φx, Φz).

To acquire radial loads (Fx, Fz) applied between the outer ring 1 and the hub 2, it is necessary to be care of the following points. That is, it is general to calculate the radial loads (Fx, Fz) from radial displacements generated in the hub 2 in the same direction as the radial loads (Fx, Fz). However, the hub 2 may be radially displaced with inclination. In this case, a magnitude of the radial displacement of the hub 2 is changed with a y-axis position. Accordingly, there is a problem that the calculation result of the radial loads (Fx, Fz) is changed according to what y-axis position the radial displacement is decoded. Therefore, it is important to decode the radial displacement at a y-axis position where the actually applied radial loads (Fx, Fz) can be calculated with high precision.

Figure 5:
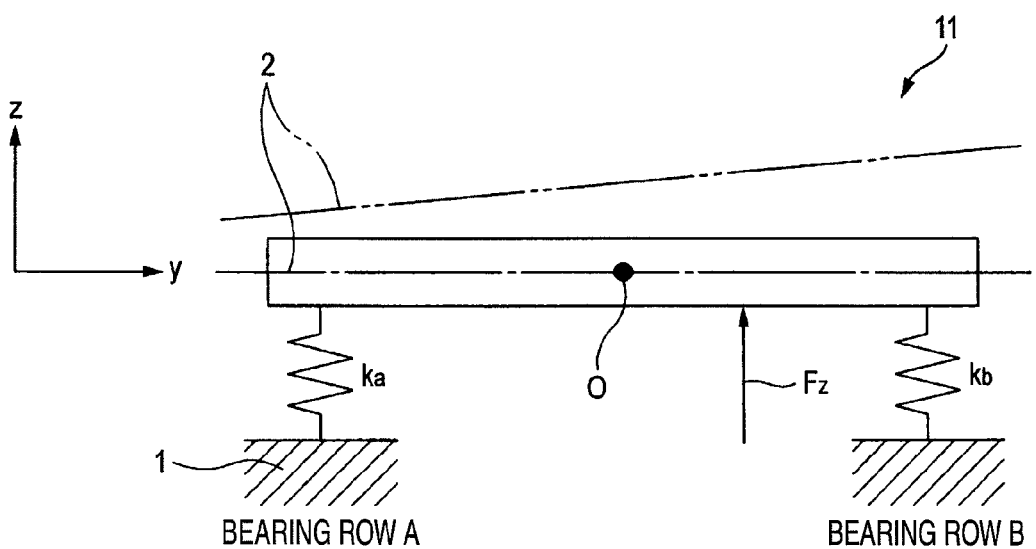
FIG. 5 is a schematic view illustrating a state where radial road Fz is applied to a y-axis position shifted from a bearing origin O.
Figure 6:
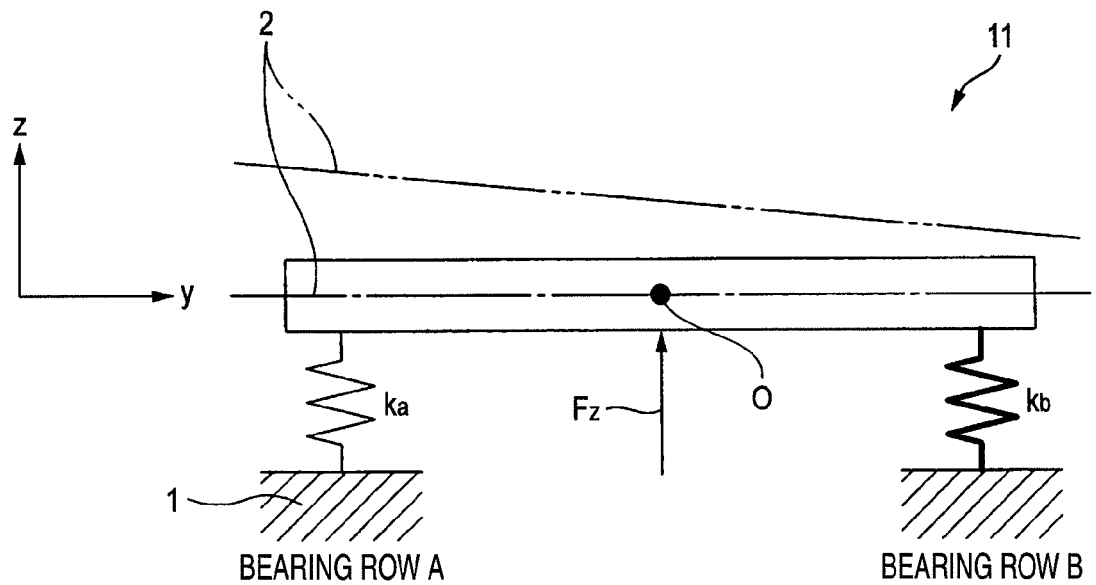
FIG. 6 is a schematic view illustrating a state where elasticities of a pair of bearing rows A and B are different from each other, though a radial load Fz is applied to a y-axis position of a bearing origin O.

On the basis of this point, a method of calculating a z-axis radial load Fz will be described hereinafter in detail. In a real automobile, there is a case where a y-axis position of an action point of the radial load Fz and a y-axis position of a bearing origin (origin between an axial outside bearing row A and an axial inside bearing row B) O of the rolling bearing unit 11 does not coincide with each other due to partial side wear or shortage of air pressure in a tire, or variation in camber angle, as schematically shown in FIG. 5. In this case, the hub 2 is radially displaced in the z-axis direction with inclination in a y-z plane, as the center line thereof is represented by a dashed double-dotted line. As schematically shown in FIG. 6, even when the y-axis position of the action point of the radial load Fz and the y-axis position of the bearing origin O coincide with each other, the hub 2 is radially displaced in the z-axis direction with inclination in the y-z plane in case where an elasticity $k_a$ of the bearing row A in the z-axis direction and an elasticity $k_b$ of the bearing row B in the z-axis direction are different from each other {$k_a \neq k_b$ ($k_a < k_b$ in the shown example)}, as the center axis thereof is represented by a dashed double-line. Accordingly, in case shown in FIGS. 5 and 6, a magnitude of the z-axis radial displacement of the hub 2 changes according to the y-axis position thereof. Therefore, there is a problem that the calculation result of the radial load Fz is changed according to what y-axis position the z-axis radial displacement is decoded.

Such a problem can be solved using an equivalent elasticity $k_{eq}(=k_a+k_b)$ of the rolling bearing unit 11 in the z-axis direction. That is, in case shown in FIGS. 5 and 6, a y-axis position (y-axis position of the elastic center of the rolling bearing unit 11) for generating the same z-axis radial displacement as a value (Fz/$k_{eq}$) obtained by dividing the radial load Fz by the equivalent elasticity $k_{eq}$ becomes the optimum y-axis position to decode the z-axis radial displacement. On the other words, when the z-axis radial displacement is decoded at this optimum y-axis position (the ninth aspect of the present invention), it is possible to calculate the actually applied radial load Fz with high precision.

Figure 7:
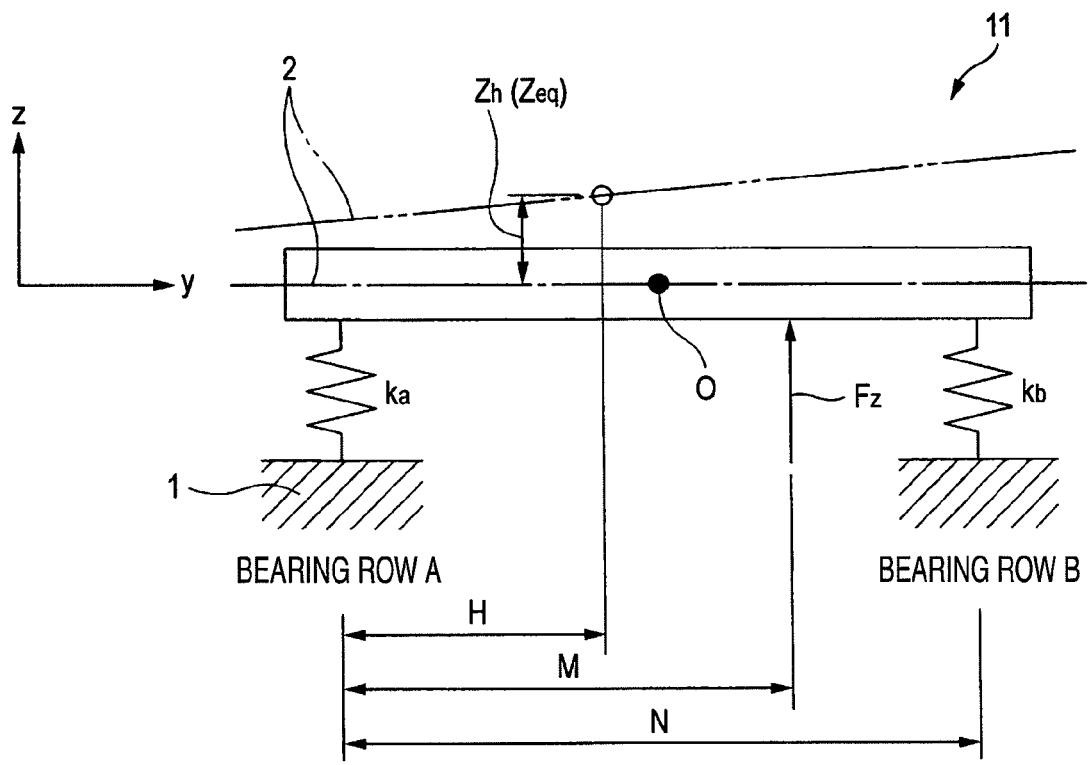
FIG. 7 is a schematic view illustrating an optimum y-axis portion for reading out a z-axis radial displacement.

This optimum y-axis position will be described in more detail with reference to FIG. 7. First, it is assumed that a y-axis distance between both bearing rows A and B is N, and a y-axis distance from the bearing row A to the action point of the radial load Fz is M. In this case, a z-axis radial displacement $z_h$ of the hub 2 at a position of a y-axis distance H from the bearing row A is represented by Equation 16.

$$z_b = \left\{ \frac{N-M}{N \cdot k_a} + \frac{H}{N} \cdot \left( \frac{M}{N \cdot k_b} - \frac{N-M}{N \cdot k_a} \right) \right\} \cdot F \tag{16}$$

Meanwhile, as described above, a z-axis radial displacement $z_{eq}$ decoded at the optimum y-axis position becomes a value (Fz/$k_{eq}$) obtained by the radial load Fz by the equivalent elasticity $k_{eq}(=k_a+k_b)$. This is represented by Equation 17.

$$z_{eq} = \left\{ \frac{N-M}{N \cdot k_a} + \frac{H}{N} \cdot \left( \frac{M}{N \cdot k_b} - \frac{N-M}{N \cdot k_a} \right) \right\} \cdot F = \frac{F}{k_a + k_b} \tag{17}$$

Accordingly, a position of a distance H satisfying Equation 17, that is, a position of a distance H represented by Equation 18 becomes the optimum y-axis position.

$$H = \frac{k_b}{k_a + k_b} \cdot N \tag{18}$$

The z-axis radial displacement $z_{eq}$ decoded at the optimum y-axis position can be acquired using a part (z, Φx) of the aforementioned five-direction displacements (x, y, z, Φx, Φz). That is, when a distance from the y-axis position of the encoder 4 to the optimum y-axis position is L (FIG. 3), the radial displacement $z_{eq}$ is represented by Equation 19.

$$z_{eq} = z - L \cdot \tan \phi_x \tag{19}$$

If the inclination Φx is very small, it may be approximated to Equation 20.

$$z_{eq} = z - L \cdot \phi_x \tag{20}$$

The radial displacement $z_{eq}$ may be measured by an electrostatic-capacity non-contact displacement sensor disposed at the optimum y-axis position. However, cost increases as much as this displacement sensor is additionally provided. There is a case where the displacement sensor cannot be disposed at the position. Even in any case, the structure for disposing the displacement sensor at the position has no relation with the present invention.

In the above description, it is assumed that the elasticities $k_a$ and $k_b$ of both bearing rows A and B are regular. However, since the rolling bearing unit 11 has a nonlinear elastic property, the elasticities may be changed by applying load from the other direction (except for z-axis). For example, in case of the rolling bearing unit 11 according to the present example, precompression is applied to both bearing rows A and B with contact angles of a back surface combination type. For this reason, when a +y (right direction in FIG. 7) axial load Fy is applied to the hub 2, a contact load of the bearing row A increases and thus the elasticity $k_a$ of the bearing row A increases, and a contact load of the bearing row B decreases and thus the elasticity $k_b$ of the bearing row B decreases. As a result, an elasticity ratio of both bearing rows A and B is changed, and the distance H representing the optimum y-axis position acquired by Equation 18 is changed. To cope with such a problem, the distance H after change is acquired on the basis of the axial load Fy calculated by the operator 13 (the twelfth aspect of the present invention), and the z-axis radial displacement is decoded at the position of the distance H after change. A moment Mx (camber moment) generated by applying the axial load Fy from a tire tread is applied to the hub 2 to generate an x-axis circumferential inclination Φx. For this reason, the distance H after change is acquired on the basis of the inclination Φx calculated by the operator 13 (the twelfth aspect of the present invention), and the z-axis radial displacement is decoded at the position of the distance H after change.

The elasticities $k_a$ and $k_b$ of both bearing rows A and B are changed also in case where a radial load is applied to the rolling bearing unit 11, as well as in case where the axial load Fy is applied to the rolling bearing unit 11. For this reason, exactly, the elasticity ratio of both bearing rows A and B is changed also by the radial load Fz to be calculated. However, in this case, all of both bearing rows A and B are allowed to have the same change in elasticity, and change in distance H representing the optimum y-axis position becomes small even when the change occurs. For this reason, a large error does not occur in the calculation result of the radial load although not particularly cope with that.

Figure 8:
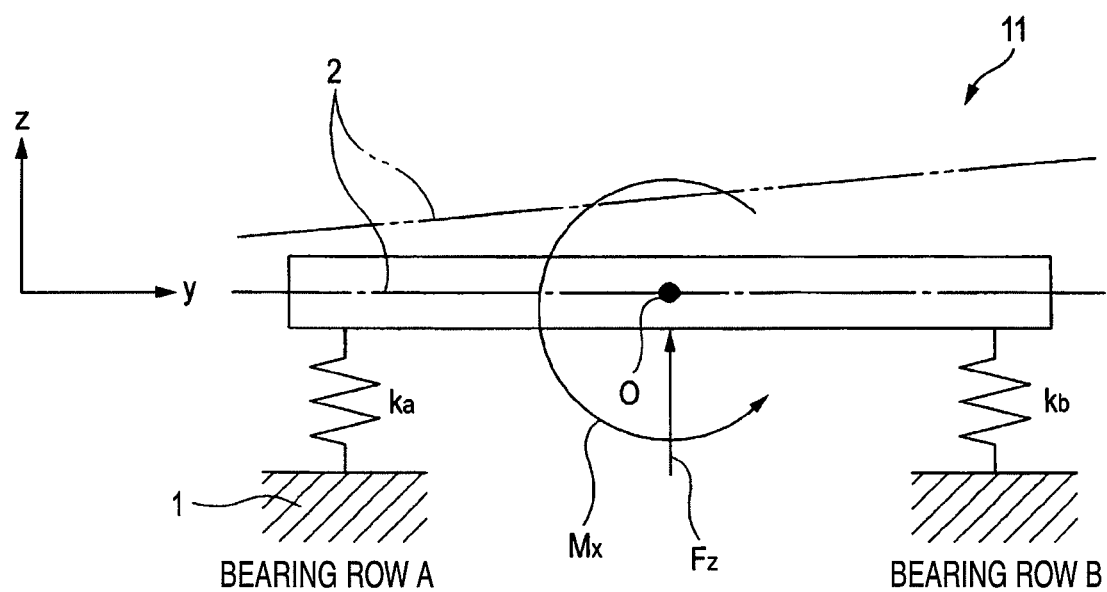
FIG. 8 is a schematic view illustrating a state where moment Mx is applied together with a radial load Fz.

Next, the other state will be described. As schematically shown in FIG. 8, although a y-axis position of an action point of a radial load Fz with respect to the rolling bearing unit 11 and a y-axis position of the bearing origin O of the rolling bearing unit 11 coincide with each other, the hub 2 is radially displaced in a z-axis direction with inclination in the y-z plane as the center axis thereof is represented by a dashed double-dotted line in the same figure when an x-axis circumferential moment is applied together with the radial load Fz. In the state shown in FIG. 8, since a magnitude of the z-axis radial displacement of the hub 2 is changed with the y-axis position, there is a problem that the calculation result of the radial load Fz is changed according to what y-axis position the radial displacement is decoded. Such a problem can be solved in the following manner. That is, when only the moment Mx is applied to the hub 2, a y-axis position where a z-axis radial displacement of the hub 2 is 0, that is, a joint position of an inclination Φx of the hub 2 generated by the moment Mx is set as a decoding position of the x-axis radial displacement (the tenth aspect of the present invention), thereby solving the problem. Since the rolling bearing unit 11 has a nonlinear elastic property, the joint position may be slight changed with a magnitude of the moment Mx (inclination Φx). In such a case, the joint position after change is acquired on the basis of the moment Mx (inclination Φx) calculated by the operator 13 (the twelfth aspect of the present invention), and the z-axis radial displacement is decoded at the joint position after change.

The x-axis circumferential moment Mx may result in error at the time of calculating an x-axis radial load (decoding an x-axis radial displacement). That is, since the moment Mx is a large moment, the inclination Φx of the hub 2 generated by the moment Mx becomes large. Herein, it is assumed that the sensors $6a_1$, $6a_2$, $6b_1$, $6b_2$, $6c_1$, and $6c_2$ are disposed at circumferential positions slightly shifted (shifted by Φx as an angle) from the predetermined circumferential positions (θ=0°, 120°, 240°). In this case, since coordinate axes of the sensors $6a_1$, $6a_2$, $6b_1$, $6b_2$, $6c_1$ and $6c_2$ are inclined by an angle Φy (in an x-y plane) around the y axis, an x-axis circumferential inclination Φx (in a y-z plane) generated by the moment Mx is detected as an inclination having a z-axis circumferential (in an x-y plane) component. The component in the x-y plane is as much as sin Φy of the angle Φy that is attachment mis-alignment. However, since the inclination Φx caused by the original moment Mx is large as described above, an error may occur in the decoded value of the x-axis radial displacement. To prevent such an error from occurring, the x-axis radial displacement is decoded at the joint position of the x-axis circumferential inclination Φx (in the y-z plane).

Summarizing the above description, to calculate the radial load Fz with high precision in the state shown in FIGS. 5 and 6, the z-axis radial displacement is decoded at the elastic center of the rolling bearing unit 11. To calculate the radial load Fz with high precision in the state shown in FIG. 8, the z-axis radial displacement is decoded at the joint position of the inclination Φx of the hub 2. In this case, if the rolling bearing unit 11 is a linear spring, y-axis positions of the elastic center and the joint position coincide with each other. However, since the rolling bearing unit 11 has a nonlinear elastic property, there is a case that y-axis positions of the elastic center and the joint position do not coincide with each other. The reason of such a situation is that contact load distributions applied to the bearing rows A and B are different from each other in the state shown in FIGS. 5 and 6 and the state shown in FIG. 8.

Even in a case where the y-axis positions of the elastic center and the joint position do not coincide with each other as described above, a large gap does not occur between both y-axis positions. For this reason, even when a y-axis position corresponding to any one state of the state shown in FIGS. 5 and 6 and the state shown in FIG. 8 is set as the position for decoding the z-axis radial displacement, there is no problem that the calculation error of the radial load Fz is large as much as to cause a practical problem at the time of the other state. That is, at the time of the other state, it is possible to make calculation precision of the radial load high in some extent (as much as no practical problem). Any y-axis position (a center position, or a position close to any one y-axis position according to degree of the problem) between the y-axis positions of the elastic center and the joint position may be set as a position for decoding the z-axis radial displacement (the eleventh aspect of the present invention). With such a configuration, it is possible to suppress the calculation error of the radial load Fz with good balance, in each of the aforementioned states.

In the above description, the method of calculating mainly the z-axis radial load Fz is described, and a method of calculating the x-axis radial load Fx is the same. For example, when the elasticity ratios of both bearing rows A and B become the same in the x-axis direction and the z-axis direction, the optimum y-axis positions for decoding the radial displacement become the same position with respect to both-axis directions. Otherwise, they become the positions different from each other.

Since the rolling bearing unit 11 in the present example has a nonlinear elastic property, it is natural that a load conversion coefficient in case of calculating the same direction radial load from the radial displacement decoded as described above is nonlinear. For this reason, it is effective that the conversion from the radial displacement into the radial load is performed by using a map.

As the optimum y-axis position for decoding the radial displacement or the load conversion coefficient, previously designed and calculated ones may be used, or ones practically measured before shipment from a factory may be used. However, in any case of them, when precompression applied to the bearing rows A and B of the rolling bearing unit 11 is changed, the optimum y-axis position or the load conversion coefficient is changed according thereto. Therefore, to cope with such a problem, it is preferable to correct the optimum y-axis position or the load conversion coefficient while measuring the precompression at the time of driving a vehicle, for example, by the method disclosed in Patent Application No. 2006-065675 or the known various kinds of methods.

As described above, according to the state measuring apparatus for a rotary machine in the present example, the five-direction displacements (displacements x, y, z, and inclinations Φx, Φz) and the five-direction loads and moments (loads Fx, Fy, Fz, and moments Mx, Mz) can be acquired using the one encoder 4. For this reason, it is possible to sufficiently reduce cost of the state measuring device 12 used at the time of acquiring these states. In addition, it is possible to sufficiently reduce size of the state measuring device 12. Accordingly, even when there is no wide attachment space in the rolling bearing unit 11, the state measuring device 12 can be easily attached to the rolling bearing unit 11. In case of the present example, since it is possible to acquire the orthogonal two-direction (x-axis direction, z-axis direction) radial displacements (x, z) and radial loads (Fx, Fz), it is possible to easily calculate the other-direction radial displacements and radial loads in the x-z plane by using these components. Similarly, in case of the present example, since the orthogonal two-axis (x-axis, z-axis) circumferential inclinations (Φx, Φz) and moments (Mx, Mz), it is possible to easily calculate the other-axis circumferential inclinations and moments in the x-z plane by using these components.

In case of the first example of the embodiment described above, the space 2δ between the centers of the detection portions of one pair of sensors $6a_1$ ($6b_1$, $6c_1$) and $6a_2$ ($6b_2$, $6c_2$) constituting each sensor set is generally small. Accordingly, if an error is acceptable, the five-direction displacements (displacements x, y, z, and inclinations Φx, Φz) may be calculated using δ=0. That is, in case of δ=0, Equations 3 to 8 can be replaced with Equations 21 to 26.

$$\varepsilon_{out}(0) = -\frac{1}{P} \cdot x - \frac{1}{P} \cdot y - \frac{R}{P} \cdot \phi_x \quad (21)$$

$$\varepsilon_{in}(0) = -\frac{1}{P} \cdot x + \frac{1}{P} \cdot y + \frac{R}{P} \cdot \phi_x \quad (22)$$

$$\varepsilon_{out}(120) = +\frac{0.5}{P} \cdot x - \frac{1}{P} \cdot y + \frac{0.866}{P} \cdot z + \frac{0.5 \cdot R}{P} \cdot \phi_x - \frac{0.866 \cdot R}{P} \cdot \phi_z \quad (23)$$

-continued $$\varepsilon_{in}(120) = +\frac{0.5}{P} \cdot x + \frac{1}{P} \cdot y + \frac{0.866}{P} \cdot z - \frac{0.5 \cdot R}{P} \cdot \phi_x + \frac{0.866 \cdot R}{P} \cdot \phi_z \quad (24)$$

$$\varepsilon_{out}(240) = +\frac{0.5}{P} \cdot x + \frac{1}{P} \cdot y - \frac{0.866}{P} \cdot z + \frac{0.5 \cdot R}{P} \cdot \phi_x + \frac{0.866 \cdot R}{P} \cdot \phi_z \quad (25)$$

$$\varepsilon_{in}(240) = +\frac{0.5}{P} \cdot x + \frac{1}{P} \cdot y - \frac{0.866}{P} \cdot z - \frac{0.5 \cdot R}{P} \cdot \phi_x - \frac{0.866 \cdot R}{P} \cdot \phi_z \quad (26)$$

In addition, Equations 9 to 13 can be replaced with Equations 27 to 31.

$$\varepsilon_{in}(0) - \varepsilon_{out}(0) = +\frac{2}{P} \cdot y + \frac{2 \cdot R}{P} \cdot \phi_x \quad (27)$$

$$\varepsilon_{in}(120) - \varepsilon_{out}(120) = +\frac{2}{P} \cdot y - \frac{1.0 \cdot R}{P} \cdot \phi_x + \frac{1.732 \cdot R}{P} \cdot \phi_z \quad (28)$$

$$\varepsilon_{in}(240) - \varepsilon_{out}(240) = +\frac{2}{P} \cdot y - \frac{1.0 \cdot R}{P} \cdot \phi_x - \frac{1.732 \cdot R}{P} \cdot \phi_z \quad (29)$$

$$\varepsilon_{out}(120) - \varepsilon_{out}(0) = +\frac{1.5}{P} \cdot x + \frac{0.866}{P} \cdot z + \frac{1.5 \cdot R}{P} \cdot \phi_x - \frac{0.866 \cdot R}{P} \cdot \phi_z \quad (30)$$

$$\varepsilon_{out}(240) - \varepsilon_{out}(0) = +\frac{1.5}{P} \cdot x - \frac{0.866}{P} \cdot z + \frac{1.5 \cdot R}{P} \cdot \phi_x + \frac{0.866 \cdot R}{P} \cdot \phi_z \quad (31)$$

In addition, Equation 14 can be replaced with Equation 32.

$$\begin{bmatrix} \varepsilon_{in}(0) - \varepsilon_{out}(0) \\ \varepsilon_{in}(120) - \varepsilon_{out}(120) \\ \varepsilon_{in}(240) - \varepsilon_{out}(240) \\ \varepsilon_{out}(120) - \varepsilon_{out}(0) \\ \varepsilon_{out}(240) - \varepsilon_{out}(0) \end{bmatrix} = \frac{1}{P} \cdot \begin{bmatrix} 0 & +2 & 0 & +2 \cdot R & 0 \\ 0 & +2 & 0 & -1.0 \cdot R & +1.732 \cdot R \\ 0 & +2 & 0 & -1.0 \cdot R & -1.732 \cdot R \\ +1.5 & 0 & +0.866 & +1.5 \cdot R & -0.866 \cdot R \\ +1.5 & 0 & -0.866 & +1.5 \cdot R & +0.866 \cdot R \end{bmatrix} \cdot \begin{bmatrix} x \\ y \\ z \\ \phi_x \\ \phi_z \end{bmatrix} \quad (32)$$

In addition, Equation 15 can be replaced with Equation 33.

$$\begin{bmatrix} x \\ y \\ z \\ \phi_x \\ \phi_z \end{bmatrix} = P \cdot \begin{bmatrix} 0 & +2 & 0 & +2 \cdot R & 0 \\ 0 & +2 & 0 & -1.0 \cdot R & +1.732 \cdot R \\ 0 & +2 & 0 & -1.0 \cdot R & -1.732 \cdot R \\ +1.5 & 0 & +0.866 & +1.5 \cdot R & -0.866 \cdot R \\ +1.5 & 0 & -0.866 & +1.5 \cdot R & +0.866 \cdot R \end{bmatrix}^{-1} \cdot \begin{bmatrix} \varepsilon_{in}(0) - \varepsilon_{out}(0) \\ \varepsilon_{in}(120) - \varepsilon_{out}(120) \\ \varepsilon_{in}(240) - \varepsilon_{out}(240) \\ \varepsilon_{out}(120) - \varepsilon_{out}(0) \\ \varepsilon_{out}(240) - \varepsilon_{out}(0) \end{bmatrix} \quad (33)$$

As clarified by comparing Equation 33 with Equation 15, in Equation 33, matrix elements of the inverse matrix on the right side do not include a term relating to δ. Accordingly, it is possible to reduce the amount of calculation of the operator 13 as much as that. As a result, it is possible to improve responsibility of a driving control about safe driving.

Second Embodiment

Figure 9:
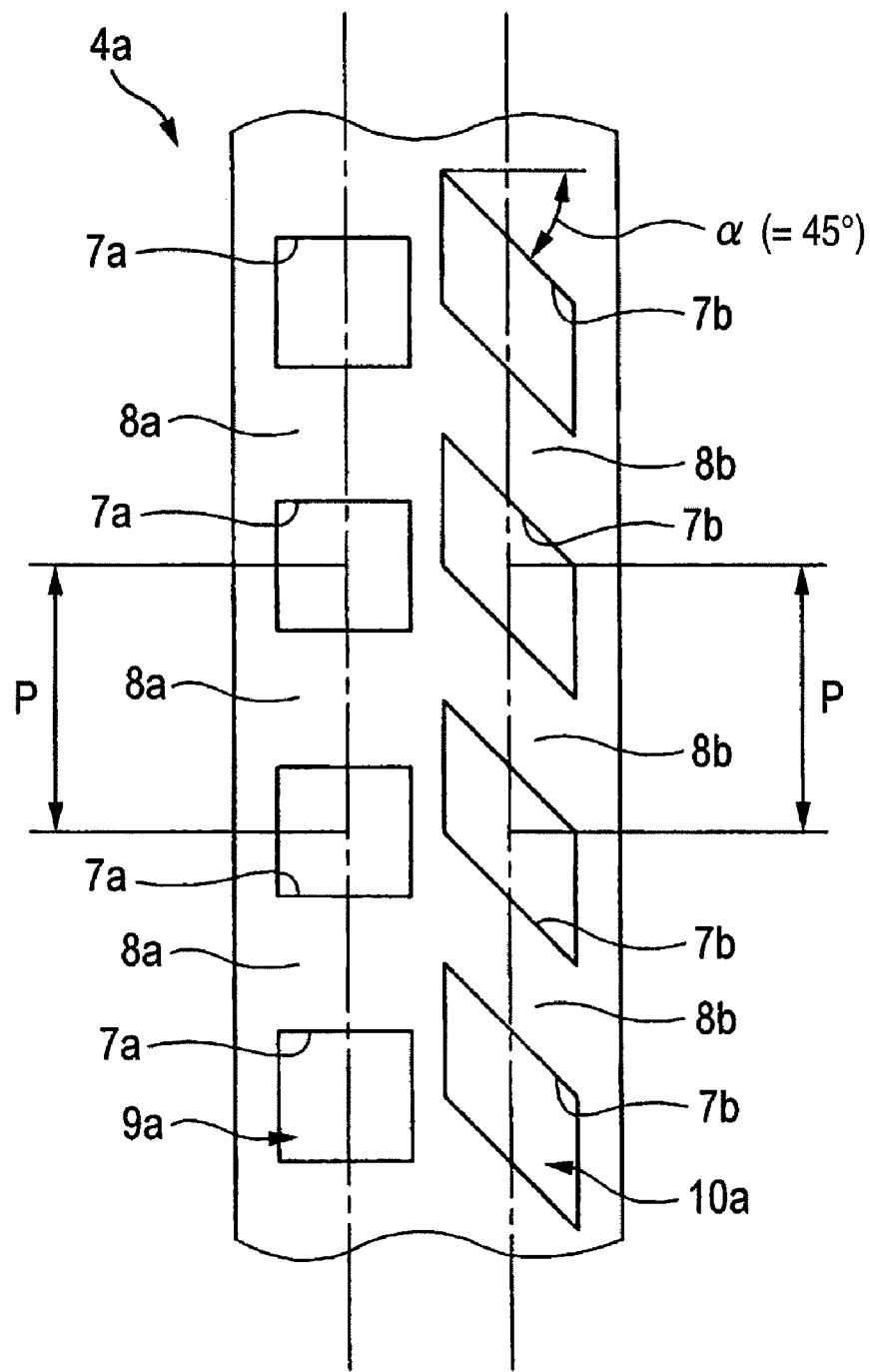
FIG. 9 is the same view as FIG. 2, illustrating a second example according to an embodiment of the invention.

FIG. 9 illustrates a second example corresponding to the sixth aspect of the present invention, according to the embodiment of the invention. The present example has a characteristic in a detection surface of an encoder 4a. Since structures and operations of the other parts are the same as the case of the first example according to the embodiment, overlapping illustration and description thereof are omitted or simplified. Hereinafter, characteristic parts of the present example will be mainly described.

In case of the present example, a plurality of through-holes 7a and 7a constituting a first characteristic change portion 9a and a plurality of through-holes 7b and 7b constituting a second characteristic change portion 10a are formed independently from each other on the detection surface of the encoder 4a. In addition, boundaries between the through-holes 7b and 7b and column portions 8b and 8b constituting the second characteristic change portion 10a are inclined to an axial direction (right and left direction in FIG. 9) by an angle α (=45°), similarly with the case of the first example according to the embodiment. On the contrary, boundaries between the through-holes 7a and 7a and column portions 8a and 8a constituting the first characteristic change portion 9a are parallel to the axial direction. That is, in case of the present example, a phase in characteristic change of the second characteristic change portion 10a gradually changes in the axial direction, but a phase in characteristic change of the first characteristic change portion 9a does not change in the axial direction. In case of the present embodiment, pitches in characteristic change of both characteristic change portions 9a and 10a are defined as P.

In case of the present example using the encoder 4a described above, Equations 21 to 26 of the first example according to the embodiment can be replaced with Equations 34 to 39.

$$\varepsilon_{out}(0) = -\frac{1}{P} \cdot x \tag{34}$$

$$\varepsilon_{in}(0) = -\frac{1}{P} \cdot x + \frac{1}{P} \cdot y + \frac{R}{P} \cdot \phi_x \tag{35}$$

$$\varepsilon_{out}(120) = +\frac{0.5}{P} \cdot x + \frac{0.866}{P} \cdot z \tag{36}$$

$$\varepsilon_{in}(120) = +\frac{0.5}{P} \cdot x + \frac{1}{P} \cdot y + \frac{0.866}{P} \cdot z - \frac{0.5 \cdot R}{P} \cdot \phi_x + \frac{0.866 \cdot R}{P} \cdot \phi_z \tag{37}$$

$$\varepsilon_{out}(240) = +\frac{0.5}{P} \cdot x - \frac{0.866}{P} \cdot z \tag{38}$$

$$\varepsilon_{in}(240) = +\frac{0.5}{P} \cdot x + \frac{1}{P} \cdot y - \frac{0.866}{P} \cdot z - \frac{0.5 \cdot R}{P} \cdot \phi_x - \frac{0.866 \cdot R}{P} \cdot \phi_z \tag{39}$$

In addition, Equations 27 to 31 of the first example according to the embodiment can be replaced with Equations 40 to 44.

$$\varepsilon_{in}(0) - \varepsilon_{out}(0) = +\frac{1}{P} \cdot y + \frac{R}{P} \cdot \phi_x \tag{40}$$

$$\varepsilon_{in}(120) - \varepsilon_{out}(120) = +\frac{1}{P} \cdot y - \frac{0.5 \cdot R}{P} \cdot \phi_x + \frac{0.866 \cdot R}{P} \cdot \phi_z \tag{41}$$

$$\varepsilon_{in}(240) - \varepsilon_{out}(240) = +\frac{1}{P} \cdot y - \frac{0.5 \cdot R}{P} \cdot \phi_x - \frac{0.866 \cdot R}{P} \cdot \phi_z \tag{42}$$

$$\varepsilon_{out}(120) - \varepsilon_{out}(0) = +\frac{1.5}{P} \cdot x + \frac{0.866}{P} \cdot z \tag{43}$$

$$\varepsilon_{out}(240) - \varepsilon_{out}(0) = +\frac{1.5}{P} \cdot x - \frac{0.866}{P} \cdot z \tag{44}$$

In addition, Equation 32 of the first example according to the embodiment can be replaced with Equation 45.

$$\begin{bmatrix} \varepsilon_{in}(0) - \varepsilon_{out}(0) \\ \varepsilon_{in}(120) - \varepsilon_{out}(120) \\ \varepsilon_{in}(240) - \varepsilon_{out}(240) \\ \varepsilon_{out}(120) - \varepsilon_{out}(0) \\ \varepsilon_{out}(240) - \varepsilon_{out}(0) \end{bmatrix} = \frac{1}{P} \cdot \begin{bmatrix} 0 & +1 & 0 & +R & 0 \\ 0 & +1 & 0 & -0.5 \cdot R & +0.866 \cdot R \\ 0 & +1 & 0 & -0.5 \cdot R & -0.866 \cdot R \\ +1.5 & 0 & +0.866 & 0 & 0 \\ +1.5 & 0 & -0.866 & 0 & 0 \end{bmatrix} \cdot \begin{bmatrix} x \\ y \\ z \\ \phi_x \\ \phi_z \end{bmatrix} \tag{45}$$

In addition, Equation 33 of the first example according to the embodiment can be replaced with Equation 46.

$$\begin{bmatrix} x \\ y \\ z \\ \phi_x \\ \phi_z \end{bmatrix} = P \cdot \begin{bmatrix} 0 & +1 & 0 & +2 \cdot R & 0 \\ 0 & +1 & 0 & -0.5 \cdot R & +0.866 \cdot R \\ 0 & +1 & 0 & -0.5 \cdot R & -0.866 \cdot R \\ +1.5 & 0 & +0.866 & 0 & 0 \\ +1.5 & 0 & -0.866 & 0 & 0 \end{bmatrix}^{-1} \cdot \begin{bmatrix} \varepsilon_{in}(0) - \varepsilon_{out}(0) \\ \varepsilon_{in}(120) - \varepsilon_{out}(120) \\ \varepsilon_{in}(240) - \varepsilon_{out}(240) \\ \varepsilon_{out}(120) - \varepsilon_{out}(0) \\ \varepsilon_{out}(240) - \varepsilon_{out}(0) \end{bmatrix} \tag{46}$$

Accordingly, also in case of the present example, when the right side of Equation 46 is calculated by the operator 13, it is possible to calculate five unknown quantities (displacements x, y, z, and inclinations Φx, Φz). As clarified by comparing Equation 33 of the first example of the embodiment, in Equation 46 of the present example, the number of 0 included in the reverse matrix on the right side is larger than that of Equation 33 of the first example of the embodiment. In the other words, in case of Equation 46 of the present example, the number of matrix elements except for 0 included in the reverse matrix is reduced to ¾ as compared with the case of Equation 33 of the first example of the embodiment (16 in Equation 33, but 12 in Equation 46). Meanwhile, the amounts of calculation of the matrix and the reverse matrix are proportional to the number of matrix elements except for 0 included in the matrix and the reverse matrix. For this reason, in case of the present example, it is possible to reduce the amount of calculation at the time of calculating the five unknown quantities (displacements x, y, z, and inclinations Φx, Φz), as compared with the case of the first example of the embodiment. Accordingly, it is possible to calculate the five unknown quantities (displacements x, y, z, and inclinations Φx, Φz) with a state closer to real time. As a result, it is possible to improve responsibility of a driving control about securing a driving stability.

The invention is not limited to the configurations of the embodiments, and various configurations may be employed within the scope satisfying the requirements described in Claims. For example, Dispositional phases of three sensor sets in the circumferential direction are not necessarily at equal distances, but may be at non-equal distances. In addition, dispositional phases of one pair of sensors constituting the same sensor set in the circumferential direction does not necessarily coincide with each other, but may be shifted from each other. In these cases, when Equations 3 to 8 (Equations 21 to 26, and Equations 34 to 39) are calculated again on the basis of Equation 1 and 2 in accordance with the method of disposing the sensors, it is possible to calculate five-direction displacements (displacements x, y, z, and inclinations $\Phi x$, $\Phi z$) in the same order as the case of the embodiment. As described at the later part of the first example of the embodiment, in case of embodying the invention, the space $2\delta$ between the centers of the detection portions of one pair of sensors constituting each sensor set is generally small. Accordingly, if an error is acceptable, the five-direction displacements (displacements x, y, z, and inclinations $\Phi x$, $\Phi z$) may be calculated using $\delta=0$. Accordingly, since it is possible to raise the speed of a calculation process, it is possible to improve responsibility of a driving control about securing a driving stability. Although Equations 3 to 8 (Equations 21 to 26, and Equations 34 to 39) are derived on the basis of only geometrical positional relation, in actual, there is a case that a phase difference ratio is not generated as theory due to influences such as Gap dependence, nonlinearity, and directivity. As countermeasure in this case, for example, Equations 3 to 8 (Equations 21 to 26, and Equations 34 to 39) are corrected for use on the basis of the practically measured values. In addition, Equations 3 to 8 (Equations 21 to 26, and Equations 34 to 39) are practically measured before shipment from a factory, and the practically measured values are applied to software installed in the operator 13 for use.

In case of embodying the invention, five phase difference ratios used for calculating five displacements (x, y, z, $\Phi x$, $\Phi z$) are not limited to the five combinations of each two sensors employed in the embodiments, but may be acquired from other five combinations of each two sensors (e.g., "two combinations of each two sensors in which each detection portions is opposed to the first characteristic change portion"+ "two combinations of each two sensors in which each detection portions is opposed to the second characteristic change portion"+"one combination of one pair of sensors constituting any one sensor set"=total five combinations). Using the aforementioned other five combinations of each two sensors, Equations 9 to 13 (Equations 27 to 31, Equations 40 to 44) can be calculated and measured. Accordingly, when these are used in Equation 15 (Equation 33, Equation 46), it is possible to calculate the five-direction displacement. The phase difference ratios among the other five kinds of each two sensors may be converted into phase difference ratios among the five kinds of each two sensors embodied in the embodiments. In addition, there are grasped phase difference ratios between two sensors constituting sensor sets different from each other, which are opposed to the first and second characteristic change portions, respectively. Accordingly, from a phase difference ratio between these sensors and one pair of sensors constituting any one sensor set, a phase difference ratio between one pair of sensors constituting the other two sensor sets may be calculated.

As described in the first example of the embodiment, the relation between a predetermined-direction displacement (e.g., x) of the rotary raceway ring with respect to the stationary raceway ring and the same-direction load (e.g., Fx) applied between both raceway rings is slightly changed by the other-direction loads or moments (e.g., Fy, Fz, Mx, Mz) applied between both raceway ring at that time. For the influence due to the other-direction loads, the relations between the same-directions loads or moments and the other-direction loads or moments is previously examined by experiment or simulation. When the predetermined-direction load is calculated by using map convergence or simultaneous equations by software installed in the operator, it is possible to calculate the predetermined-direction load with high precision because of removing the influence of the other-direction loads or moments. When the position of the action point of the radial loads (Fx, Fz) is changed in the axial direction by partial side wear or shortage of air pressure in a tire, or variation in camber angle, the radial displacements in the axial positions are changed though the direction and magnitude of the radial loads are not changed. Also, in this case, an axial position (a position of an axial distance L from a sensor installation portion, see FIG. 3) exists where the radial displacements are constantly regular. Accordingly, when the radial loads (Fx, Fz) are calculated on the basis of the radial displacements at the position of the axial distance L, it is possible to acquire the radial loads (Fx, Fz) with high precision because of removing the influence of change in position of the action point. The axial distance L can be acquired on the basis of the axial load Fy calculated from the axial displacement y or the like measured by the sensor installation portion. The radial displacement at the position of the axial distance L can be geometrically acquired on the basis of the axial distance L and five-direction displacements (displacements x, y, z, and inclinations $\Phi x$, $\Phi z$) measured in the sensor installation portion.

While the invention is described with reference to the specific embodiments, it is obvious to a person skilled in the art to variously modify or amend the present invention within the concept and scope of the present invention. This application claims priority from Japanese Patent Application No. 2006-051605, filed Feb. 28, 2006, Japanese Patent Application No. 2006-214194, filed Aug. 7, 2006, and Japanese Patent Application No. 2006-345849, filed Dec. 22, 2006, the contents of which are incorporated by reference herein.

INDUSTRIAL APPLICABILITY

According to the invention, to acquire the load applied between the rotary raceway ring and the stationary raceway ring, it is not necessary to acquire the amount of relative displacement of the rotary raceway ring and the stationary raceway ring. That is, the operator can have a function of directly (without the course of calculating the amount of relative displacement) calculating the load applied between the stationary raceway ring and the rotary raceway ring, on the basis of the output signals of the sensors.

The invention claimed is:

1. A state measuring apparatus for a rotary machine, the apparatus comprising:
   a rotary machine including:
      a stationary member that does not rotate in a using state; and
      a rotary member rotatably supported to the stationary member; and
   a state measuring device including:
      an encoder provided concentrically to the rotary member or to a member rotating together with the rotary member;
      a sensor device supported and fixed to the stationary member; and
      an operator, wherein the encoder is provided with:
- a detection surface disposed on a circumferential surface of the encoder; and
- first and second characteristic change portions alternately disposed on the detection surface at equal distances in a circumferential direction, wherein characteristics of the first and second characteristic change portions alternately change in the circumferential direction with equal pitches, and at least one of phases in characteristic change of the first and second characteristic change portions gradually changes in an axial direction with being different from that of the other characteristic change portion, wherein the sensor device includes three or more sensors for changing an output signal in response to change in characteristic of a portion to which the detection portion is opposed, a detection portion of one sensor among them is opposed to the first characteristic change portion, a detection portion of another sensor is opposed to the second characteristic portion, and a detection portion of the other sensor is opposed to a portion that does not overlap with a portion to which the detection portion of the other sensors is opposed in the first and second characteristic change portions, and wherein the operator has a function of calculating displacements or inclinations of the encoder with respect to the stationary member in two or more directions, on the basis of at least two phase differences of phase differences between output signals of the sensors.

2. The state measuring apparatus according to claim 1, wherein the sensor device includes three sensor sets each consisting of a pair of sensors, the detection portion of one sensor of the pair of sensors constituting each sensor set is opposed to a portion where circumferential positions of the first characteristic change portion are different from each other, and the detection portion of the other sensor is opposed to a portion where circumferential positions are different from each other in the second characteristic change portion, and wherein when a y-axis of 3-dimensional rectangular coordinates consisting of an x-axis, a y-axis, and a z-axis orthogonal to one another coincides with a center axis of the stationary member, the operator has a function of calculating a displacement x in an x-axis direction, a displacement y in a y-axis direction, and a displacement z in a z-axis direction, an x-axis circumferential inclination $\Phi x$, and a z-axis circumferential inclination $\Phi z$ of the encoder with respect to the stationary member, on the basis of five phase differences between output signals of two sensors, in five combinations of each two sensor selected from the sensors.

3. The state measuring apparatus according to claim 2, wherein the five combinations of each two sensors include three combinations of each two sensors constituting the same sensor sets as each other and two combinations of each two sensors constituting the different sensor sets from each other.

4. The state measuring apparatus according to claim 2, wherein the detection portion of one sensor and the detection portion of the other sensor constituting each of the sensor sets are at the same position in the circumferential direction, and are opposed to the first characteristic change portion and the second characteristic change portion, respectively.

5. The state measuring apparatus according to claim 2, wherein the detection portion of one sensor constituting each of the sensor sets is opposed to a circumferential equal-distance position of the first characteristic change portion, and the detection portion of the other sensor is opposed to a circumferential equal-distance position of the second characteristic change portion.

6. The state measuring apparatus according to claim 1, wherein a phase in characteristic change of the other characteristic change portion of the first and second characteristic change portions does not change in the axial direction.

7. The state measuring apparatus according to claim 1, wherein the operator has a function of calculating an external force applied between the stationary member and the rotary member, on the basis of the displacement and the inclination of the encoder with respect to the stationary member calculated by the operator.

8. The state measuring apparatus according to claim 7, wherein the operator has a function of calculating a radial displacement of the rotary member at a predetermined position of the stationary member in the axial direction, on the basis of the displacement and the inclination of the encoder with respect to the stationary member calculated by the operator, and calculating a radial load in the same direction as the radial displacement applied between the stationary member and the rotary member on the basis of the radial displacement.

9. The state measuring apparatus according to claim 8, wherein an axial position of an elastic center of the rotary machine in the same direction as the radial displacement for calculation is an predetermined position of the stationary member in the axial direction.

10. The state measuring apparatus for a rotary machine according to claim 8, wherein an axial position, where the radial displacement of the rotary member is 0 at the time when only a moment is applied between the stationary member and the rotary member, is a predetermined position of the stationary member in the axial direction.

11. The state measuring apparatus according to claim 8, wherein any axial position, between an axial position of an elastic center of the rotary machine in the same direction as the radial displacement for calculation and an axial position where the radial displacement of the rotary member is 0 at the time when only a moment is applied between the stationary member and the rotary member, is a predetermined position of the stationary member in the axial direction.

12. The state measuring apparatus according to claim 7, wherein the operator corrects a predetermined position of the stationary member in the axial direction, on the basis of a component in a direction different from the radial displacement for calculation, in the displacement or the inclination of the encoder with respect to the stationary member calculated by the operator, or in the external force applied between the stationary member and the rotary member calculated on the basis of the displacement or the inclination.

13. The state measuring apparatus according to claim 1, wherein the rotary machine is a rolling bearing unit, and
wherein the rolling bearing unit includes:
- a stationary raceway ring that is the stationary member;
- a rotary raceway ring that is the rotary member; and
- a plurality of rolling elements that are provided between the stationary raceway ring and the rotary raceway ring.

14. The state measuring apparatus according to claim 13, wherein the rolling bearing unit is a hub unit for supporting an automobile wheel, the stationary raceway ring is supported to a suspension device of an automobile in a using state, and the wheel is coupled and fixed to a hub that is the rotary raceway ring.

* * * * *